United States Patent
Zhan et al.

(10) Patent No.: US 11,764,860 B2
(45) Date of Patent: *Sep. 19, 2023

(54) RADIO FREQUENCY SIGNAL BOOSTERS FOR PROVIDING INDOOR COVERAGE OF HIGH FREQUENCY CELLULAR NETWORKS

(71) Applicant: Cellphone-Mate, Inc., Fremont, CA (US)

(72) Inventors: Hongtao Zhan, Fremont, CA (US); Scott Terry, Pleasanton, CA (US)

(73) Assignee: Cellphone-Mate, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,005

(22) Filed: Apr. 27, 2022

(65) Prior Publication Data
US 2022/0399933 A1 Dec. 15, 2022

Related U.S. Application Data

(63) Continuation of application No. 16/946,337, filed on Jun. 17, 2020, now Pat. No. 11,349,556.

(Continued)

(51) Int. Cl.
*H04B 7/155* (2006.01)
*H01Q 1/24* (2006.01)
(Continued)

(52) U.S. Cl.
CPC ......... *H04B 7/15507* (2013.01); *H01Q 1/246* (2013.01); *H04L 5/14* (2013.01); *H04W 16/14* (2013.01)

(58) Field of Classification Search
CPC ..... H04B 10/2575; H04J 14/02; H04Q 11/00; H04L 5/14; H04W 16/14; H04W 16/26
See application file for complete search history.

(56) References Cited

U.S. PATENT DOCUMENTS

| | | |
|---|---|---|
| 4,972,346 A | 11/1990 | Kawano et al. |
| 5,369,782 A | 11/1994 | Kawano et al. |
| | (Continued) | |

FOREIGN PATENT DOCUMENTS

| | | |
|---|---|---|
| CA | 3065949 A1 | 12/2018 |
| WO | WO 87/07439 A1 | 12/1987 |
| | (Continued) | |

OTHER PUBLICATIONS

Pivotal Echo 5G 28 GHz Repeater with Holographic Beam Forming Technology Datasheet, dated May 2020 in 8 pages.
(Continued)

*Primary Examiner* — Iqbal Zaidi
(74) *Attorney, Agent, or Firm* — Knobbe, Martens, Olson & Bear, LLP

(57) ABSTRACT

Radio frequency signal boosters for high frequency cellular communications are provided herein. In certain embodiments, a signal booster system for providing high frequency wireless signal reception of a 5G network inside a building is provided. The signal booster system includes a primary unit configured to communicate with cellular infrastructure (e.g., a base station) of the 5G network through a window of a first room of the building, and an auxiliary unit for extending coverage from the first room to a second room. The auxiliary unit includes a housing located in the first room and having a base station antenna and booster circuitry integrated therewith. The auxiliary unit further includes a mobile station antenna in the second room and connected to the housing by a short cable.

20 Claims, 11 Drawing Sheets

Related U.S. Application Data

(60) Provisional application No. 62/864,044, filed on Jun. 20, 2019.

(51) Int. Cl.
*H04W 16/14* (2009.01)
*H04L 5/14* (2006.01)

(56) References Cited

U.S. PATENT DOCUMENTS

| | | | |
|---|---|---|---|
| 8,867,572 | B1 | 10/2014 | Zhan |
| 9,100,839 | B2 | 8/2015 | Zhan |
| 9,402,190 | B2 | 7/2016 | Zhan |
| 9,432,852 | B2 | 8/2016 | Zhan et al. |
| 9,673,886 | B2 | 6/2017 | Zhan et al. |
| 9,775,051 | B2 | 9/2017 | Zhan |
| 9,936,396 | B2 | 4/2018 | Zhan |
| 10,313,893 | B2 | 6/2019 | Zhan |
| 10,585,460 | B2 | 3/2020 | Mouser et al. |
| 11,265,075 | B2 | 3/2022 | Zhan et al. |
| 11,349,556 | B2 | 5/2022 | Zhan et al. |
| 11,595,110 | B1 | 2/2023 | Zhan et al. |
| 11,637,619 | B2 | 4/2023 | Zhan et al. |
| 2004/0110469 | A1 | 6/2004 | Judd et al. |
| 2004/0166802 | A1 | 8/2004 | McKay, Sr. et al. |
| 2006/0014491 | A1 | 1/2006 | Cleveland |
| 2006/0148468 | A1 | 7/2006 | Mann et al. |
| 2006/0205343 | A1 | 9/2006 | Runyon et al. |
| 2007/0218951 | A1 | 9/2007 | Risheq et al. |
| 2007/0254632 | A1 | 11/2007 | Beadle et al. |
| 2008/0039012 | A1 | 2/2008 | McKay et al. |
| 2008/0144543 | A1 | 6/2008 | Hunton et al. |
| 2010/0035542 | A1 | 2/2010 | Fujishima et al. |
| 2011/0006957 | A1 | 1/2011 | Scire-Scappuzzo et al. |
| 2012/0189078 | A1 | 7/2012 | Eom et al. |
| 2014/0139395 | A1 | 5/2014 | Solondz |
| 2015/0070244 | A1 | 3/2015 | McCown |
| 2015/0351135 | A1 | 12/2015 | Schmidt et al. |
| 2016/0088494 | A1 | 3/2016 | Zhan |
| 2016/0205633 | A1 | 7/2016 | Mizusawa |
| 2016/0269132 | A1 | 9/2016 | Clark et al. |
| 2016/0381563 | A1 | 12/2016 | Khalek et al. |
| 2017/0111161 | A1 | 4/2017 | Raggio et al. |
| 2017/0111864 | A1 | 4/2017 | Ashworth et al. |
| 2017/0141837 | A1 | 5/2017 | Cook et al. |
| 2017/0317738 | A1* | 11/2017 | Lange ............... H04B 7/155 |
| 2017/0331546 | A1 | 11/2017 | Zhan et al. |
| 2018/0070323 | A1 | 3/2018 | Zhan |
| 2018/0077585 | A1 | 3/2018 | Zhan |
| 2018/0139627 | A1 | 5/2018 | Ashworth et al. |
| 2018/0139708 | A1 | 5/2018 | Zhan |
| 2018/0331752 | A1 | 11/2018 | Ashworth et al. |
| 2018/0351633 | A1 | 12/2018 | Birkmeir et al. |
| 2018/0364771 | A1 | 12/2018 | Mouser et al. |
| 2019/0089452 | A1 | 3/2019 | Ashworth |
| 2019/0123774 | A1 | 4/2019 | Zhan et al. |
| 2019/0123805 | A1 | 4/2019 | Zhan |
| 2019/0132024 | A1 | 5/2019 | Zhan et al. |
| 2019/0140733 | A1 | 5/2019 | Zhan |
| 2019/0196555 | A1 | 6/2019 | Mouser et al. |
| 2019/0341995 | A1 | 11/2019 | Ashworth et al. |
| 2019/0394734 | A1 | 12/2019 | Zhan |
| 2020/0028568 | A1 | 1/2020 | Zhan et al. |
| 2020/0029226 | A1 | 1/2020 | Zhan |
| 2020/0076465 | A1 | 3/2020 | Guo |
| 2020/0344739 | A1 | 10/2020 | Rofougaran et al. |
| 2020/0350943 | A1 | 11/2020 | Zhan et al. |

FOREIGN PATENT DOCUMENTS

| | | |
|---|---|---|
| WO | WO 2004/079946 A1 | 9/2004 |
| WO | WO 2006/059074 A2 | 6/2006 |

OTHER PUBLICATIONS

Pivotal Echo 5G 39 GHz Repeater with Holographic Beam Forming Technology Datasheet, dated May 2020 in 8 pages.

Pivotal Commware, Reducing 5G Deployment Costs using Holographic Beam Forming Repeaters from Pivotal Commware, dated May 2020 in 11 pages.

Pivot 5G 28 GHz Network Repeater with Holographic Beam Forming Technology Datasheet, dated Jun. 2020 in 8 pages.

* cited by examiner

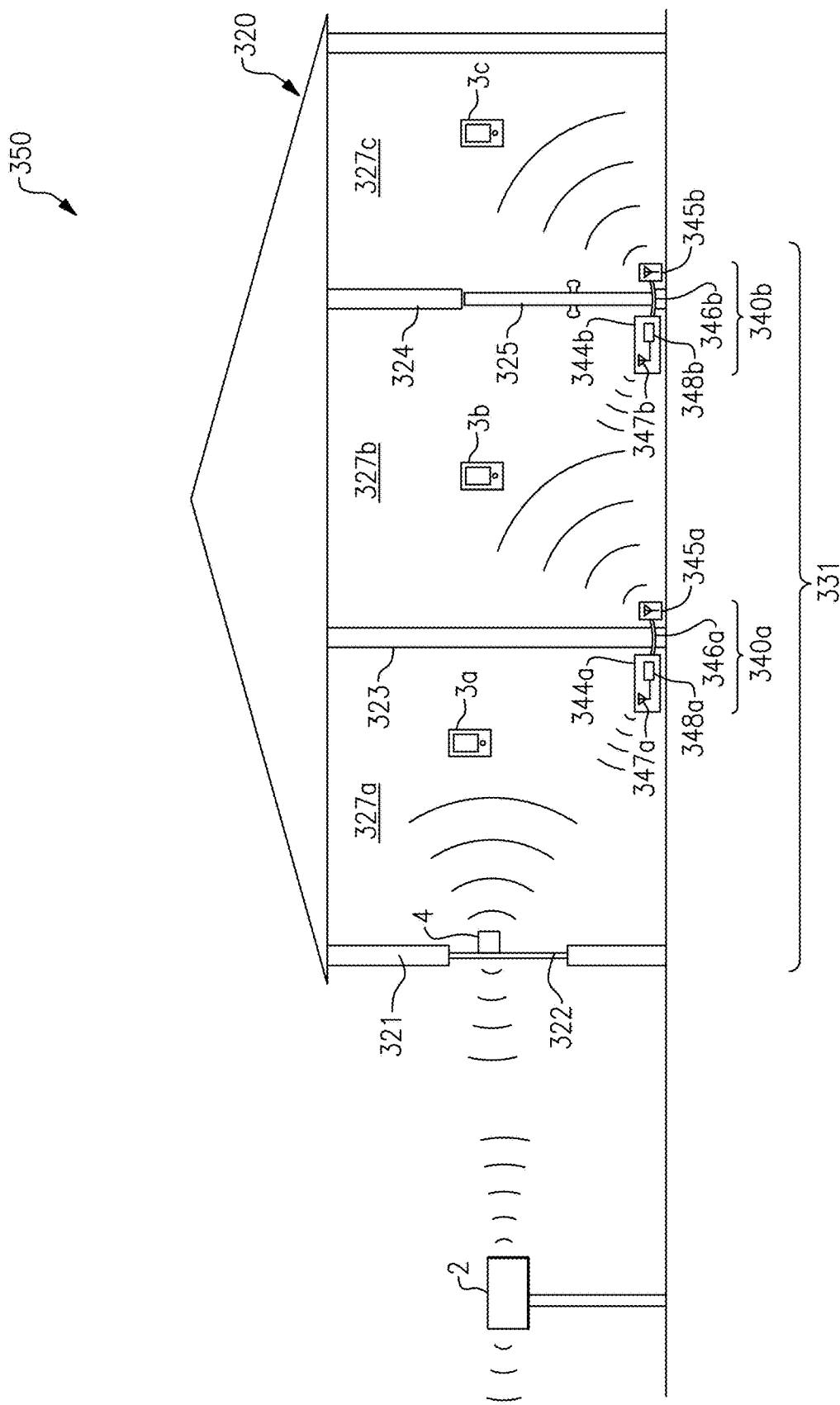

RADIO FREQUENCY SIGNAL BOOSTERS FOR PROVIDING INDOOR COVERAGE OF HIGH FREQUENCY CELLULAR NETWORKS

REFERENCE TO RELATED CASES

This application is a continuation of U.S. patent application Ser. No. 16/946,337, filed Jun. 17, 2020 and titled "RADIO FREQUENCY SIGNAL BOOSTERS FOR PROVIDING INDOOR COVERAGE OF HIGH FREQUENCY CELLULAR NETWORKS" which claims the benefit of priority under 35 U.S.C. § 119 of U.S. Provisional Patent Application No. 62/864,044, filed Jun. 20, 2019 and titled "RADIO FREQUENCY SIGNAL BOOSTERS FOR PROVIDING INDOOR COVERAGE OF HIGH FREQUENCY CELLULAR NETWORKS," each of which is herein incorporated by reference in its entirety.

FIELD

Embodiments of the invention relate to electronic systems and, in particular, to radio frequency (RF) signal boosters.

BACKGROUND

A cellular or mobile network can include base stations for communicating with wireless devices located within the network's cells. For example, base stations can transmit signals to wireless devices via a downlink (DL) channel and can receive signals from the wireless devices via an uplink (UL) channel. In the case of a network operating using frequency division duplexing (FDD), the downlink and uplink communications are separated in the frequency domain such that the frequency band operates using a pair of frequency channels. In the case of a network operating using time division duplexing (TDD), the downlink and uplink communications are on a common frequency channel with uplink and downlink transmissions occurring during different time slots.

A wireless device may be unable to communicate with any base stations when located in a portion of the mobile network having poor or weak signal strength. To improve a network's signal strength and/or coverage, a radio frequency (RF) signal booster can be used to amplify signals in the network. For example, the signal booster can be used to amplify or boost signals having frequencies associated with the frequency ranges of the network's uplink and downlink channels.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description of Embodiments" one will understand how the features of this invention provide advantages that include improved communications between base stations and mobile devices in a wireless network.

In one aspect, a signal booster system for a high frequency cellular network. The signal booster system includes a signal boosting unit including a base station antenna configured to receive a downlink signal of a frequency band and to transmit an amplified uplink signal of the frequency band, wherein the base station antenna is directional. The signal boosting unit further includes booster circuitry configured to amplify an uplink signal of the frequency band to generate the amplified uplink signal, and to amplify the downlink signal to generate an amplified downlink signal of the frequency band, wherein the frequency band is higher than 20 gigahertz (GHz). The signal boosting unit further includes a housing in which the base station antenna and the booster circuitry are integrated therewith. The signal boosting unit further includes a mobile station antenna configured to receive the uplink signal and to transmit the amplified downlink signal, wherein the mobile station antenna is configured to connect to the housing by a cable.

In another aspect, a signal boosting unit for a high frequency cellular network. The signal boosting unit includes a base station antenna configured to receive a downlink signal and to transmit an amplified uplink signal, wherein the base station antenna is directional. The signal boosting unit further includes booster circuitry configured to amplify an uplink signal to generate the amplified uplink signal, and to amplify the downlink signal to generate an amplified downlink signal, a housing in which the base station antenna and the booster circuitry are integrated therewith, and a mobile station antenna configured to receive the uplink signal and to transmit the amplified downlink signal, wherein the mobile station antenna is configured to connect to the housing by a cable.

In another aspect, a signal boosting unit for a high frequency cellular network is provided. The signal boosting unit includes a base station antenna configured to receive a downlink signal and to transmit an amplified uplink signal, wherein the base station antenna is directional. The signal boosting unit further includes booster circuitry configured to amplify an uplink signal to generate the amplified uplink signal, and to amplify the downlink signal to generate an amplified downlink signal, a mobile station antenna configured to receive the uplink signal and to transmit the amplified downlink signal, and a housing in which the base station antenna, the booster circuitry, and the mobile station antenna are integrated therewith.

In another aspect, a multi-unit signal booster system for a high frequency cellular network is provided. The multi-unit signal booster system includes a primary signal boosting unit comprising a base station antenna, booster circuitry, and a mobile station antenna. The multi-unit signal booster system further includes an auxiliary signal boosting unit comprising a base station antenna, booster circuitry, a housing in which the base station antenna and the booster circuitry are integrated therewith, and a mobile station antenna configured to connect to the housing by a cable. The base station antenna of the auxiliary signal boosting unit is configured to receive an amplified downlink signal from the mobile station antenna of the primary signal boosting unit, and the mobile station antenna of the primary signal boosting unit is configured to receive an amplified uplink signal from the base station antenna of the auxiliary signal boosting unit.

BRIEF DESCRIPTION OF THE DRAWINGS

FIG. 5 is a schematic diagram of another embodiment of a signal booster system operating in a cellular network.

DETAILED DESCRIPTION OF EMBODIMENTS

Figure 1:
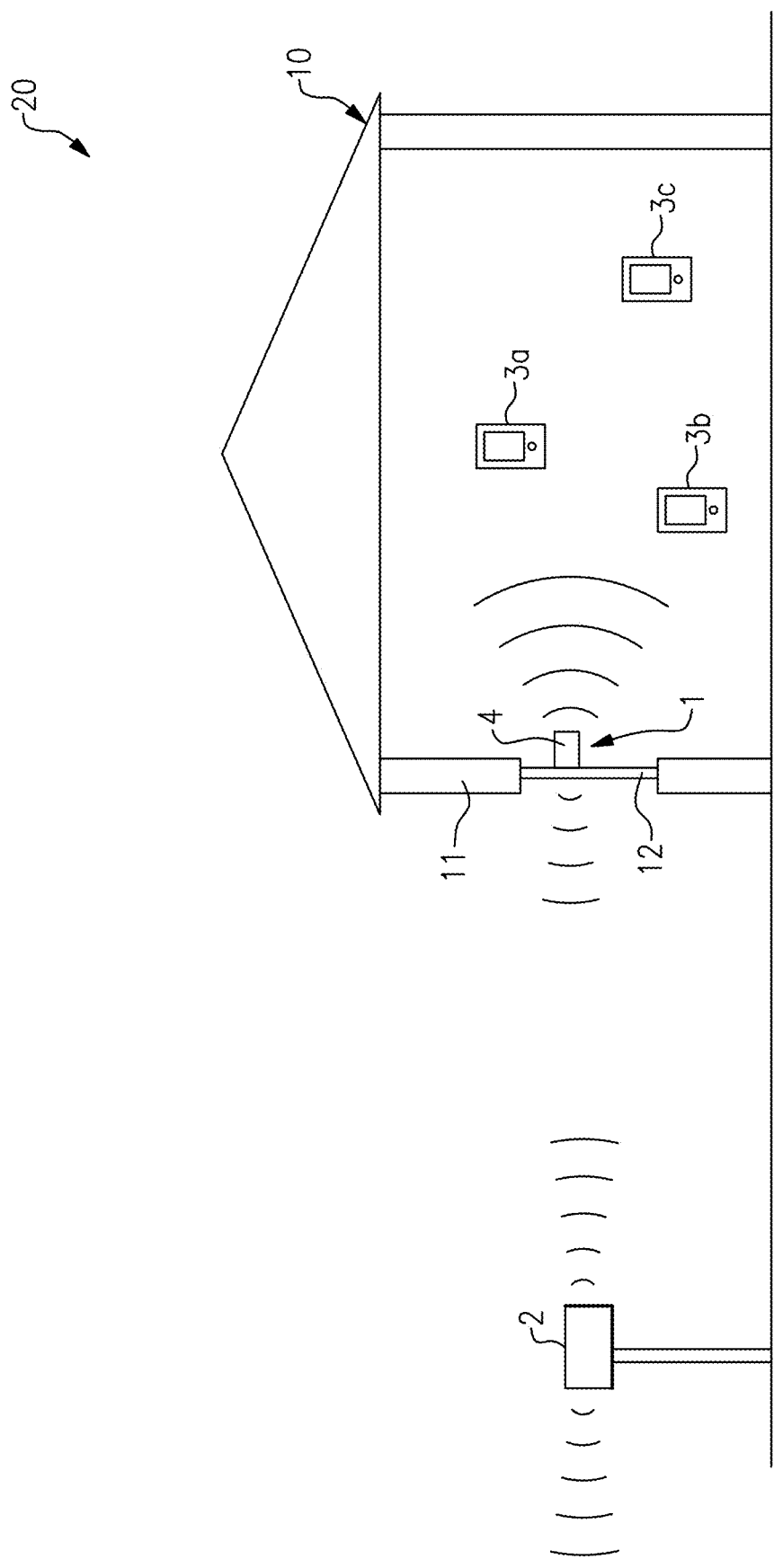
FIG. 1 is a schematic diagram of one embodiment of a signal booster system operating in a cellular network.

Various aspects of the novel systems, apparatus, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatus, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Installing a signal booster system in a building can advantageously improve both downlink signal strength and uplink signal strength of mobile devices within the building. For example, walls of buildings can have a shielding effect on signals transmitted and received by mobile devices indoors. Furthermore, buildings can include metal, such as beams, pipes, brackets, nails, and screws that operate to inhibit propagation of radio waves.

The shielding effect of buildings can attenuate downlink signals from the base station within the buildings and/or attenuate uplink signals transmitted from within the buildings. Under most conditions, the shielding effect can cause signal strength to drop. In one example, the shielding effect reduces signal strength below a threshold for cellular communication, thereby preventing successful voice and/or data communication. In another example, a mobile device operates with higher transmit power to compensate for a loss in signal strength from shielding, and thus operates with greater power consumption and reduced battery life. In yet another example, the mobile device operates with lower signal quality, and thus lower data rate and/or lower voice quality.

The amount of signal attenuation provided by buildings increases with signal frequency. Thus, the impact of the shielding effect of buildings is exacerbated in high frequency cellular communications, such as cellular networks communicating using millimeter wave (mmW) signals. For instance, signals communicated using Frequency Range 2 (FR2) of fifth generation (5G) technologies can suffer from very high loss when propagating through walls, windows, and/or other building structures. Loss is particularly significant for FR2 frequencies of about 20 GHz and higher.

To provide indoor cellular signal coverage, a base station antenna of a signal booster system can be placed on a roof of a building to achieve a robust communication link with a base station, such as line-of-sight communication. Additionally, a mobile station antenna of the signal booster system can be placed inside of the building, and used to communicate with mobile devices therein.

However, in such an implementation, the cost of installation can be relatively high. For example, such installation can necessitate a technician, which can be costly and/or inconvenient. Furthermore, a length of a cable to reach the mobile station antenna can be several meters long, resulting in significant cable loss. Such cable loss can reduce transmit power and/or degrade receiver sensitivity. Moreover, cable loss is frequency dependent, and can be particularly exacerbated when the cable carries RF signals over 6 GHz, such as millimeter wave signals in the frequency range of 30 GHz to 300 GHz.

RF signal boosters for high frequency cellular communications are provided herein. In certain embodiments, a signal booster system for providing high frequency wireless signal reception of a 5G network inside a building is provided. The signal booster system includes a primary unit configured to communicate with cellular infrastructure (e.g., a base station) of the 5G network through a window of a first room of the building, and an auxiliary unit for extending coverage from the first room to a second room. The auxiliary unit includes a housing located in the first room and having a base station antenna and booster circuitry integrated therewith. The auxiliary unit further includes a mobile station antenna in the second room and connected to the housing by a short cable. One or more additional auxiliary units can be daisy chained with the auxiliary unit to extend coverage into other rooms of the building.

FIG. 1 is a schematic diagram of one embodiment of a signal booster system 1 operating in a cellular network 20. The cellular network 20 represents a portion of a 5G network.

As shown in FIG. 1, the signal booster system 1 includes a signal boosting unit 4 that is installed in an interior of a building 10. Additionally, the building 10 includes an outer wall 11 having a window 12 therein. The signal boosting unit 4 is attached to an interior surface of the window 12, in this example.

The signal boosting unit 4 includes a base station antenna, signal booster circuitry, and a mobile station antenna integrated in a common housing. The signal boosting unit 4 can be attached to the window 12 in a wide variety of ways, such as by using a wide variety of mounts, adhesives, and/or fasteners.

Although FIG. 1 illustrates an example in which the signal boosting unit 4 is attached to an interior of the window 12, the teachings herein are applicable to other configurations of installation.

In certain implementations, the base station antenna of the signal boosting unit 4 is a directional antenna that is pointed in a direction of high signal strength in the wireless network 10. For instance, in the illustrated embodiment, the signal boosting unit 4 is configured to wirelessly communicate with cellular infrastructure equipment 2, which can be, for example, a base station, a cellular repeater, or an infrastructure signal booster. In one example, the cellular infrastructure equipment 2 corresponds to a base station servicing multiple homes in a neighborhood. In a second example, the cellular infrastructure equipment 2 corresponds to an infrastructure signal booster serving as an intermediary between a base station and the signal boosting unit 4.

In one embodiment, the signal boosting unit 4 and the cellular infrastructure equipment 2 are separated by a distance of less than about 100 feet. Additionally, the cellular infrastructure equipment 2 and the signal boosting unit 4 communicate with one another using directional antennas to aid high frequency wireless transmissions from the cellular infrastructure equipment 2 to penetrate the window 12 and reach the signal boosting unit 4, and for high frequency wireless transmissions from the signal boosting unit 4 to penetrate the window 12 and reach the cellular infrastructure equipment 2.

In certain implementations, the receive signal strength at the base station antenna of the signal boosting unit 4 is in the range of about −50 dBm to about −70 dBm.

By communicating through the window 12, a wireless link between the signal boosting unit 4 and the cellular infrastructure equipment 2 can be achieved.

For example, at high frequencies, such as upper centimeter wave frequencies in the range of 20 GHz to 30 GHz and millimeter wave frequencies in the range of 30 GHz to 300 GHz, loss through the wall 11 can be about 100 dB or more, thereby rendering wireless communications through the wall 11 infeasible. In contrast, the window 12 can have a loss of about 5 dB or more, for instance, about 5 dB for a transparent glass window, about 20 dB for a low emissivity (low-E) glass window, and about 40 dB for a tinted glass window.

By using directional antennas, signal energy is focused to aid in overcoming loss of the window 12.

In certain implementations, the base station antenna of the signal boosting unit 4 has a directionality of at least 17 dBi. For example, communications of the signal boosting unit 4 can be directional with 36 dBm or more of effective isotropic radiated power (EIRP).

The signal boosting unit 4 further includes an integrated mobile station antenna for primarily radiating within an interior of the building 10. Thus, the mobile station antenna of the signal boosting unit 4 can communicate with mobile devices within the building 10, such as mobile devices 3a-3c.

In certain implementations, the mobile station antenna of the signal boosting unit 4 has a directionality of 6 dBi or less. For example, the mobile station antenna can be implemented as a 180° sector antenna that radiates over a hemisphere, for instance with a base of the hemisphere substantially aligned with the wall 11 and/or window 12. In another embodiment, the mobile station antenna of the signal boosting unit 4 is omnidirectional such that the mobile station antenna radiates over a sphere.

Although the mobile network 20 is illustrated with specific examples of network equipment and user equipment, the mobile network 20 can implemented with other types equipment. For instance, mobile devices can include mobile phones, tablets, laptops, wearable electronics (for instance, smart watches), and/or other types of user equipment (UE) suitable for use in a wireless communication network. Furthermore, network equipment can include base stations, signal repeaters, infrastructure boosters, and/or other cellular infrastructure. Moreover any number of such devices and equipment can be present in the network 20.

The signal boosting unit 4 can be implemented using any suitable combination of features disclosed herein. Although an example with a home is shown, a signal booster system can be installed in a variety of types of buildings, such as homes, offices, commercial premises, factories, garages, barns, and/or any other suitable building.

In certain implementations, the mobile devices 3a-3c can communicate at least in part over multiple frequency bands, including one or more cellular bands associated with 3GPP 5G communications. Such 5G communications can include FR2 communications, such as those of 20 GHz or higher. Signals used in 5G communications are also referred to herein as 5G new radio (5G NR) signals.

In certain implementations, the signal boosting unit 4 can be configured to boost signals associated with two or more frequency bands so as to improve network reception for each of the mobile devices 3a-3c. Configuring the signal boosting unit 4 to service multiple frequency bands can improve network signal strength. For example, the signal boosting unit 4 can improve network signal strength of devices using the same or different frequency bands, the same or different wireless carriers, and/or the same or different wireless technologies. Configuring the signal boosting unit 4 as a multi-band booster can avoid the cost of separate signal boosters for each specific frequency band and/or wireless carrier.

Figure 2A:
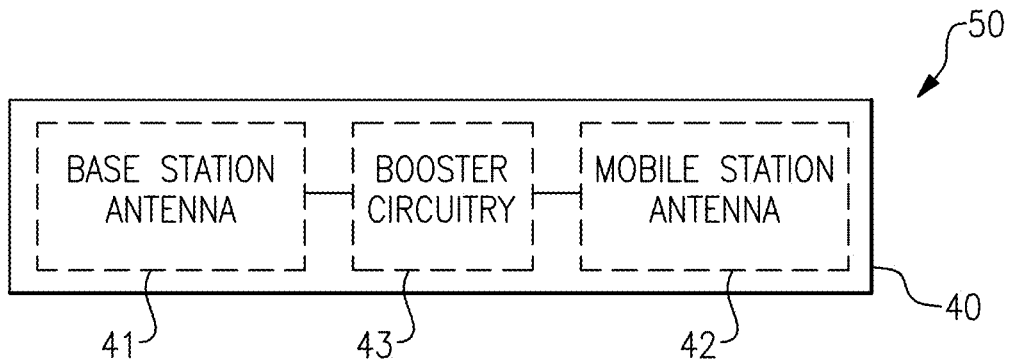
FIG. 2A is a schematic diagram of one embodiment of a signal boosting unit for a signal booster system.

FIG. 2A is a schematic diagram of one embodiment of a signal boosting unit 50 for a signal booster system. The signal boosting unit 50 includes a housing 40, a base station antenna 41, a mobile station antenna 42, and booster circuitry 43.

The signal boosting unit 50 of FIG. 2A illustrates one embodiment of the signal boosting unit 4 of FIG. 1.

The base station antenna 41, the mobile station antenna 42, and the booster circuitry 43 are integrated on and/or within the housing 40 of the signal boosting unit 50. The base station antenna 41 receives a downlink signal, which is amplified by the booster circuitry 43 to generate an amplified downlink signal that is transmitted on the mobile station antenna 42. Additionally, the mobile station antenna 42 receives an uplink signal, which is amplified by the booster circuitry 43 to generate an amplified uplink signal that is transmitted on the base station antenna 41. In certain implementations, the signal boosting unit 50 operates at least in part using time division duplexing (TDD) in which uplink and downlink transmissions occur in different time slots or windows.

The booster circuitry 43 provides amplification to RF signals associated with one or more uplink and downlink channels. The booster circuitry 43 can include a wide variety of circuitry and/or components. Examples of circuitry and components of the booster circuitry 43 include, but are not limited to, amplifiers (for instance, LNAs, power amplifiers (PAs), variable gain amplifiers (VGAs), programmable gain amplifiers (PGAs), and/or other amplification circuits), filters (for instance, surface acoustic wave (SAW) filters, bulk acoustic wave (BAW) filters, film bulk acoustic resonator (FBAR) filters, active circuit filters, passive circuit filters, and/or other filtering structures), duplexers, circulators, frequency multiplexers (for instance, diplexers, triplexers, or other multiplexing structures), switches, impedance matching circuitry, attenuators (for instance, digital-controlled attenuators such as digital step attenuators (DSAs) and/or analog-controlled attenuators such as voltage variable attenuators (VVAs)), detectors, monitors, couplers, and/or control circuitry.

Figure 2B:
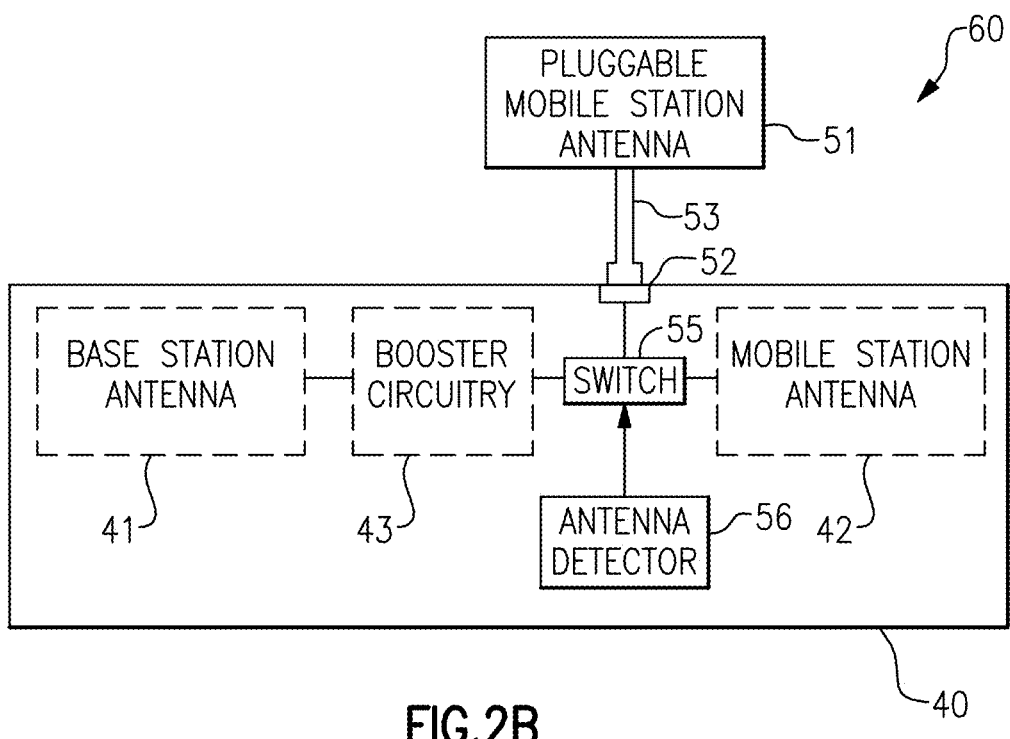
FIG. 2B is a schematic diagram of another embodiment of a signal boosting unit for a signal booster system.

FIG. 2B is a schematic diagram of another embodiment of a signal boosting unit 60 for a signal booster system.

The signal boosting unit 60 of FIG. 2B is similar to the signal boosting unit 50 of FIG. 2A, except that the signal boosting unit 60 further includes a pluggable mobile station antenna 51 having a pluggable cable 53. As shown in FIG. 2B, an outer surface of the housing 40 is implemented with a port 52 that receives the pluggable cable 53, thereby allowing the pluggable mobile station antenna 51 to be selectively connected to the housing 40. Although depicted as being pluggable on one end, either or both ends of the cable 53 can implemented to be pluggable.

With continuing reference to FIG. 2B, the signal boosting unit 60 further includes a switch 55, and an antenna detector 56 for controlling the switch 55 based on whether or not the pluggable mobile station antenna 51 is detected. For example, the antenna detector 56 can connect the pluggable mobile station antenna 51 to the booster circuitry 43 when the pluggable mobile station antenna 51 is detected, and connect the mobile station antenna 42 to the booster circuitry 43 when the pluggable mobile station antenna 51 is not detected.

Figure 2C:
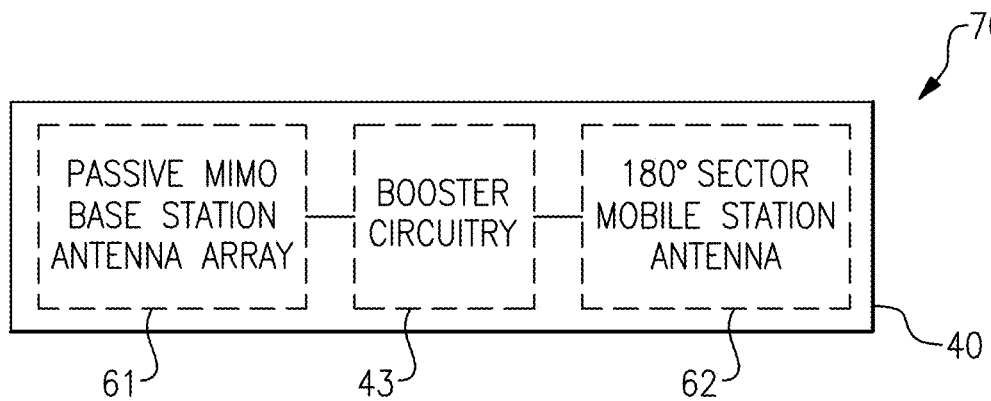
FIG. 2C is a schematic diagram of another embodiment of a signal boosting unit for a signal booster system.

FIG. 2C is a schematic diagram of another embodiment of a signal boosting unit 70 for a signal booster system.

The signal boosting unit 70 of FIG. 2C is similar to the signal boosting unit 50 of FIG. 2A, except that the signal boosting unit 70 of FIG. 2C includes a specific implementation of antennas. In particular, the signal boosting unit 70 includes a passive multiple-input multiple-output (MIMO) base station antenna array 61 and a sector mobile station antenna 62.

The passive MIMO base station antenna array 61 includes multiple antenna elements having spatial diversity, and is also referred to herein as a passive spatial diversity antenna array. In certain implementations, the passive MIMO base station antenna array 61 includes an array of planar antennas, such as patch antennas, arranged on a substrate, such as a printed circuit board (PCB). By implementing a base station antenna as a passive MIMO base station antenna array, enhanced directivity and/or higher signal-to-noise ratio (SNR) can be achieved.

With continuing reference to FIG. 2C, implementing the signal boosting unit 70 with the sector mobile station antenna 62 aids in communicating with mobile phones or other UE positioned throughout a room. In certain implementations, the sector mobile station antenna 62 can be implemented with a radiation pattern that substantially covers a hemisphere, for instance, at least 75 percent of the hemisphere.

Thus, in certain implementations the sector mobile station antenna 62 provides about 180° of angular coverage with respect to the polar angle and azimuthal angle in a spherical coordinate system. When covering at least 75 percent of the hemisphere, the sector mobile station antenna 62 provides between about 135° and about 180° of angular coverage with respect to the polar angle and azimuthal angle.

Figure 2D:
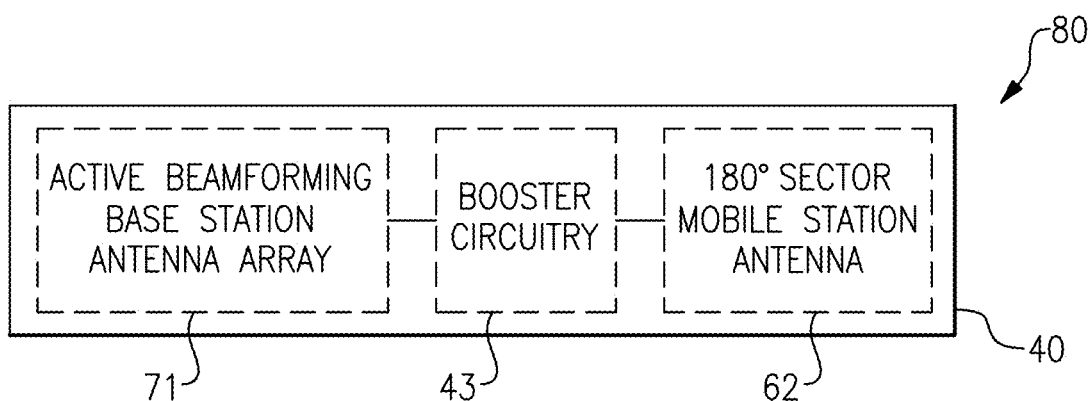
FIG. 2D is a schematic diagram of another embodiment of a signal boosting unit for a signal booster system.

FIG. 2D is a schematic diagram of another embodiment of a signal boosting unit 80 for a signal booster system.

The signal boosting unit 80 of FIG. 2D is similar to the signal boosting unit 70 of FIG. 2C, except that the signal boosting unit 80 of FIG. 2D includes a base station antenna implemented as an active beamforming base station antenna array 71 rather than as the passive MIMO base station antenna array 61 as in FIG. 2C.

Implementing the signal boosting unit 80 with the active beamforming base station antenna array 71 aids in providing beamforming that can allow the signal boosting unit 80 to control the angle of signals transmitted or received. For example, the active beamforming base station antenna array 71 can include an array of antenna elements each associated with a controllable gain element and a controllable phase element. By controlling the gain and phase of signals transmitted and/or received by each element of the array, beamforming can be achieved.

For instance, with respect to signal transmission, the gain and phase of the signals transmitted on each antenna element can be controlled such that the signals radiated from the antenna elements combine using constructive and destructive interference to generate an aggregate transmit beam pointing in a desired direction. Additionally, with respect to the signal reception, the gain and phase of signals received on each antenna element can be controlled such that the combined received signal favors signals received from a particular direction.

Implementing the signal boosting unit 80 with the active beamforming base station antenna array 71 provides a number of advantages. For example, when the signal boosting unit 80 is installed in the building 10 of FIG. 1, beamforming can be used to compensate for an installation error in pointing the signal boosting unit toward the cellular infrastructure equipment 2.

Moreover, in certain implementations, the signal boosting unit 80 can be implemented to regularly realign or calibrate a direction of beamforming, thereby compensating for changes in the relative positions and/or orientations of the signal boosting unit 80 and/or the cellular infrastructure equipment 2 over time. For instance, when installed on the window 12, the position of the signal boosting unit 80 can change when the window 12 is opened or closed and/or by occupants (including people and/or pets) of the building 10. Furthermore, the cellular infrastructure equipment 2 can also move over time, for instance, due to weather and/or handling.

Accordingly, beamforming can be used to align communications between the signal boosting unit 80 and the cellular infrastructure equipment 2, thereby enhancing the strength of the wireless communication link therebetween.

Figure 2E:
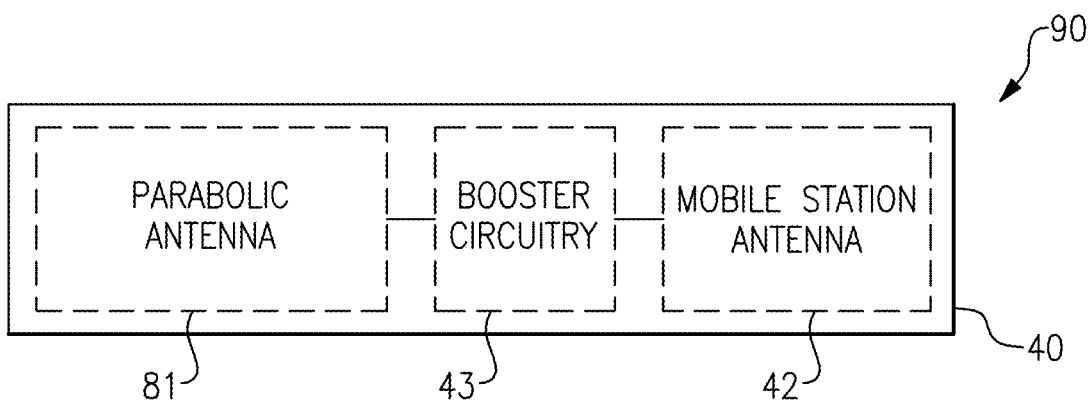
FIG. 2E is a schematic diagram of another embodiment of a signal boosting unit for a signal booster system.

FIG. 2E is a schematic diagram of another embodiment of a signal boosting unit 90 for a signal booster system.

The signal boosting unit 90 of FIG. 2E is similar to the signal boosting unit 50 of FIG. 2A, except that the signal boosting unit 90 of FIG. 2E includes a specific implementation of a base station antenna. In particular, the signal boosting unit 90 includes a parabolic antenna 81 for serving as a base station antenna.

Figure 3:
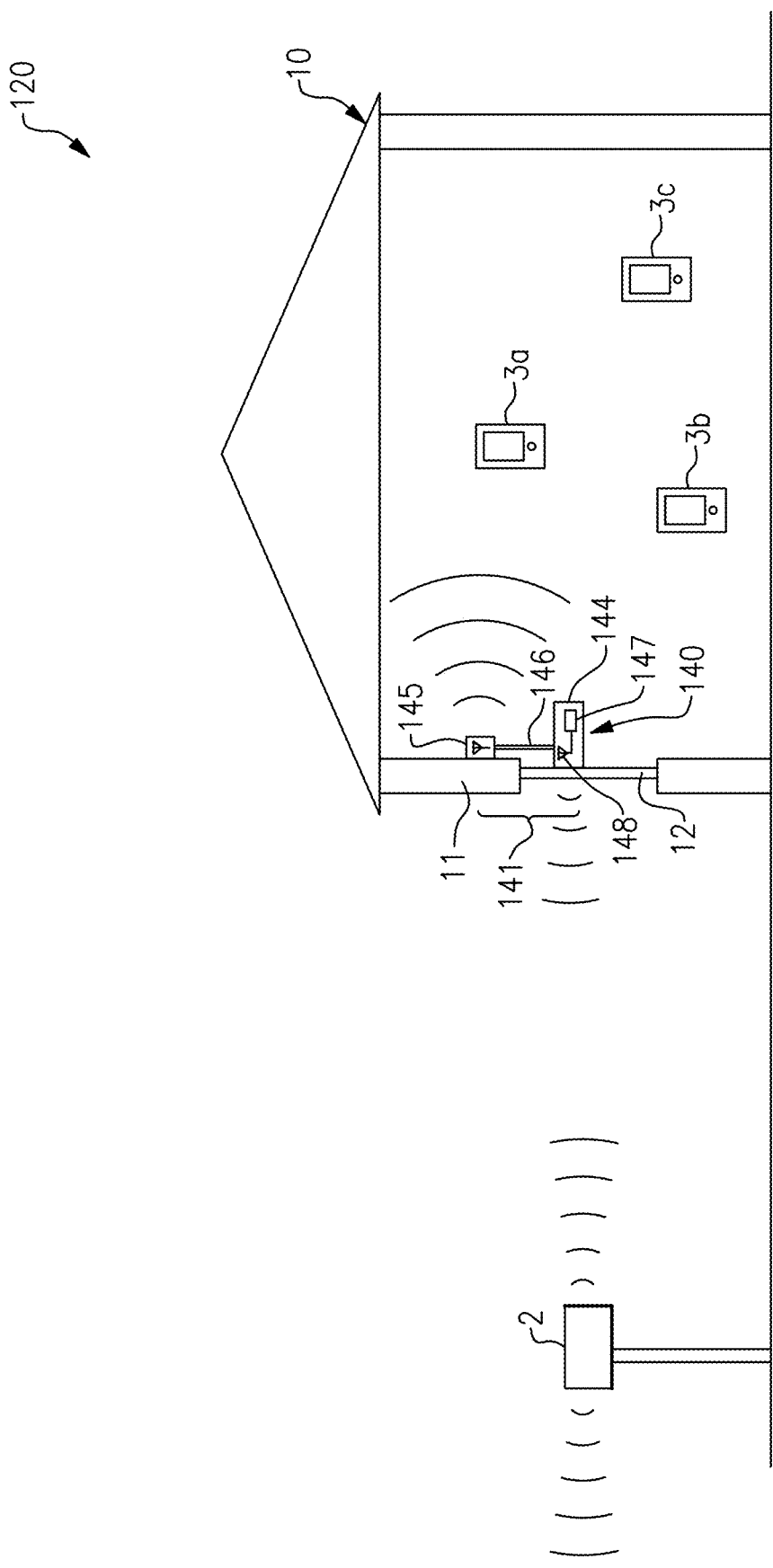
FIG. 3 is a schematic diagram of another embodiment of a signal booster system operating in a cellular network.

FIG. 3 is a schematic diagram of another embodiment of a signal booster system 140 operating in a cellular network 120.

The signal booster system 140 includes a signal boosting unit 141 including a housing 144 in which a base station antenna 147 and booster circuitry 148 have been integrated. Additionally, the signal boosting unit 141 further includes a mobile station antenna 145 connected to the housing 144 by way of a cable 146.

Accordingly, in comparison to the signal boosting unit 4 of FIG. 1 in which booster circuitry, the mobile station antenna, and the base station antenna are all integrated in a common housing, the signal boosting unit 141 separates the housing 144 (in which booster circuitry 147 and a base station antenna 148 are integrated) from the mobile station antenna 145 by the cable 146.

Separating the mobile station antenna 145 in this manner can enhance antenna-to-antenna isolation between mobile station and base station antennas, thereby inhibiting unintended oscillations from occurring.

In certain implementations, the length of the cable 146 is less than about 5 feet. Implementing the cable 146 with short length can aid in reducing cable loss, thereby enhancing the strength of indoor signal coverage. For example, at upper centimeter wave frequencies, cable loss can in the range of about 0.5 dB to 1 dB per foot of cable.

In certain implementations, the cable 146 is pluggable on either or both ends.

Figure 4A:
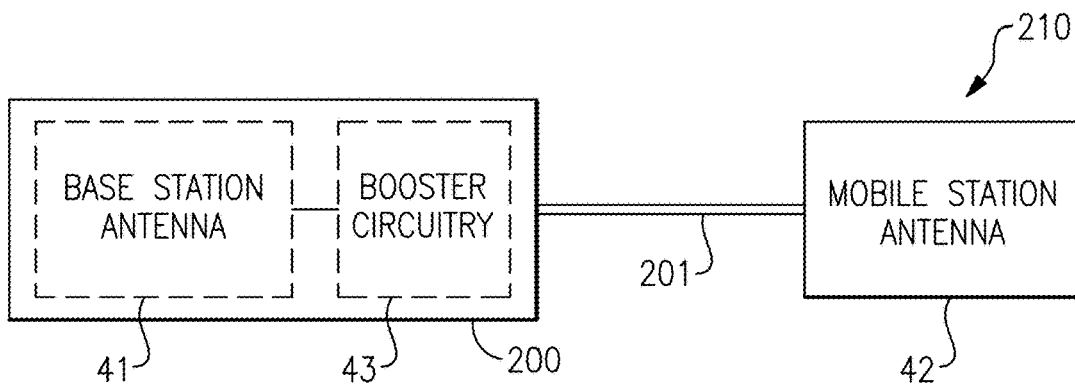
FIG. 4A is a schematic diagram of another embodiment of a signal boosting unit for a signal booster system.

FIG. 4A is a schematic diagram of another embodiment of a signal boosting unit 210 for a signal booster system. The signal boosting unit 210 of FIG. 4A illustrates one embodiment of the signal boosting unit 141 of FIG. 3.

The signal boosting unit 210 includes a housing 200 including booster circuitry 43 therein. The base station antenna 41 and the booster circuitry 43 are integrated in this example. For example, the base station antenna 41 can be implemented within and/or on the housing 200. The signal boosting unit 210 further includes a mobile station antenna 43 connected to the booster circuitry 200 by a cable 201, which in some implementations is pluggable on one or both ends. In certain implementations, the cable is less than 5 feet.

Figure 4B:
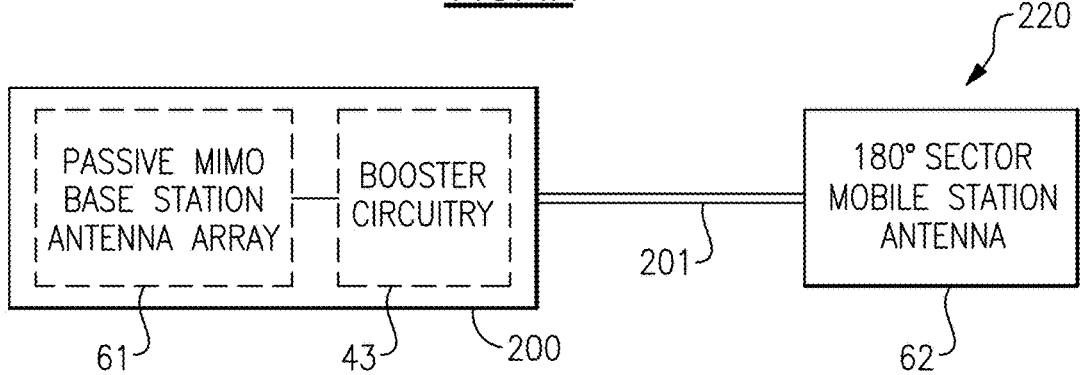
FIG. 4B is a schematic diagram of another embodiment of a signal boosting unit for a signal booster system.

FIG. 4B is a schematic diagram of another embodiment of a signal boosting unit 220 for a signal booster system.

The signal boosting unit 220 of FIG. 4B is similar to the signal boosting unit 210 of FIG. 4A, except that the signal boosting unit 220 of FIG. 4B includes a specific implementation of antennas. In particular, the signal boosting unit 210 includes a passive MIMO base station antenna array 61 and a sector mobile station antenna 62, which covers about 180° of angular range in some implementations.

Figure 4C:
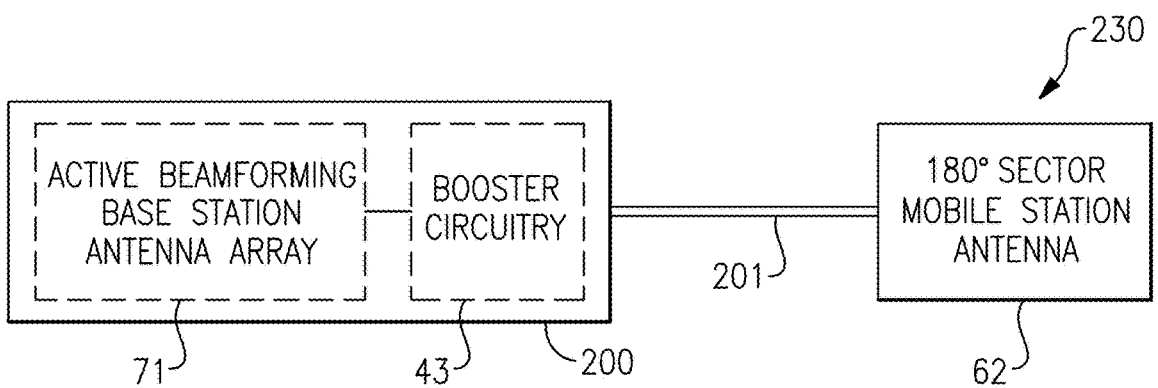
FIG. 4C is a schematic diagram of another embodiment of a signal boosting unit for a signal booster system.

FIG. 4C is a schematic diagram of another embodiment of a signal boosting unit 230 for a signal booster system.

The signal boosting unit 230 of FIG. 4C is similar to the signal boosting unit 210 of FIG. 4A, except that the signal boosting unit 230 of FIG. 4C includes a specific implementation of antennas. In particular, the signal boosting unit 230 includes an active beamforming base station antenna array 71 and a sector mobile station antenna 62, which covers about 180° of angular range in some implementations.

Figure 4D:
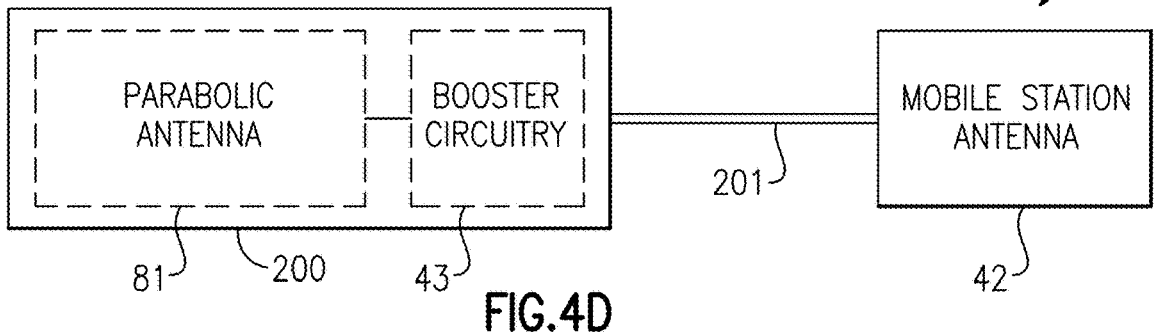
FIG. 4D is a schematic diagram of another embodiment of a signal boosting unit for a signal booster system.

FIG. 4D is a schematic diagram of another embodiment of a signal boosting unit 240 for a signal booster system.

The signal boosting unit 240 of FIG. 4D is similar to the signal boosting unit 210 of FIG. 4A, except that the signal boosting unit 240 of FIG. 4D includes a parabolic antenna 81 for serving as the base station antenna.

FIG. 5 is a schematic diagram of another embodiment of a signal booster system 331 operating in a cellular network 350. The cellular network 350 represents a portion of a 5G network.

As shown in FIG. 5, the signal booster system 331 is installed in a building 320, which includes a first room 327a, a second room 327b, and a third room 327c. Additionally, the building 320 includes an outer wall 321 having a window 322 therein. The signal booster system 331 includes a primary signal boosting unit 4 installed in the first room 327a of the building 320. The signal booster system 331 further includes a first secondary or auxiliary signal boosting unit 340a installed in the first and second rooms of the building 320, and a second auxiliary signal boosting unit 340b installed in the second and third rooms of the building 320.

The primary signal boosting unit 4 is attached to an interior surface of the window 322, in this example. Although FIG. 5 illustrates an example in which the primary signal boosting unit 4 is attached to an interior of the window 322, the teachings herein are applicable to other configurations of installation.

Furthermore, although the first auxiliary signal boosting unit 340a and the second auxiliary signal boosting unit 340b are illustrated as being placed on a floor of a room, other configurations are possible, such as implementations in which the auxiliary signal boosting unit is mounted on a wall or ceiling.

As shown in FIG. 5, the first room 327a and the second room 327b are separated by a first interior wall 323. Although the primary signal boosting unit 4 provides cellular signal reception in the first room 327a (for instance, to the mobile device 3a), the first interior wall 323 prevents the primary signal boosting unit 4 from directly transmitting high frequency signals to or receiving high frequency signals from mobile devices in the second room 327b (for instance, the mobile device 3b). Additionally, the second room 327b and the third room 327c are separated by a second interior wall 324 having a door 325. Although the primary signal boosting unit 4 provides cellular signal reception in the first room 327a, the first interior wall 323 and the second interior wall 324 prevents the primary signal boosting unit 4 from directly transmitting high frequency signals to or receiving high frequency signals from mobile devices in the third room 327c (for instance, the mobile device 3c).

To extend coverage to the second room 327b of the building 320, the first auxiliary signal boosting unit 340a has been included. The first auxiliary signal boosting unit 340a includes a housing 344a in which a base station antenna 347a and booster circuitry 348a have been integrated. The first auxiliary signal boosting unit 340a further includes a mobile station antenna 345a connected to the housing 344a by way of a cable 346a. The cable 346a is provided through the interior wall 323 and carries signals between the booster circuitry in the housing 344a located in the first room 327a and the mobile station antenna 345a located in the second room 327b.

Including the first auxiliary signal boosting unit 340a allows mobile devices in the second room 327b (for instance, the mobile device 3b) to communicate with the cellular infrastructure equipment 2.

For example, when the mobile device 3b is transmitting, the mobile station antenna 345a in the second room 327b provides the received uplink signal from the mobile device 3b to the housing 344a in the first room 327a. Additionally, booster circuitry 348a in the housing 344a amplifies the uplink signal to generate an amplified uplink signal, which is transmitted by the base station antenna 347a integrated with the housing 344a of the first auxiliary signal boosting unit 340a. The primary signal boosting unit 4 receives the uplink signal from the first auxiliary signal boosting unit 340a, and transmits an amplified uplink signal to the cellular infrastructure equipment 2.

With respect to downlink, the primary signal boosting unit 4 receives a downlink signal from the cellular infrastructure equipment 2, and transmits an amplified downlink signal to the first auxiliary signal boosting unit 340a. The first auxiliary signal boosting unit 340a receives the downlink signal using the base station antenna 347a in the first room 327a, and transmits an amplified downlink signal to the mobile device 3b using the mobile station antenna 345a in the second room 327b.

To further extend coverage to the third room 327c of the building 320, the second auxiliary signal boosting unit 340b has been included. The second auxiliary signal boosting unit 340b includes a housing 344b in which a base station antenna 347b and booster circuitry 348b have been integrated. The second auxiliary signal boosting unit 340b further includes a mobile station antenna 345b connected to the housing 344b by way of a cable 346b. The cable 346b is provided under a door 325 of the interior wall 324, and carries signals between the booster circuitry in the housing 344b located in the second room 327b and the mobile station antenna 345b located in the third room 327c.

Accordingly, the primary signal boosting unit 4, the first auxiliary signal boosting unit 340a, and the second auxiliary signal boosting unit 340b are arranged in a communication chain, also referred to herein as a daisy chain.

Although an example with two auxiliary signal boosting units is depicted, more or fewer auxiliary signal boosting units can be included. Furthermore, although an example in which a single communication chain is depicted, a signal booster system can include multiple communication chains. For instance, the primary signal boosting unit 4 can communicate not only with the first auxiliary signal boosting unit 340a, but also with one or more other auxiliary signal boosting units associated with different communication chains. Such communication chains can span multiple rooms of a structure, including not only laterally across walls, but also configurations across floors. For instance, multiple communication chains can be used to provide indoor cellular high frequency signal coverage (for instance, millimeter wave 5G swerve) within a multi-story building.

The number of signal boosting units (including a primary signal boosting unit and any auxiliary signal boosting units) can be selected based on link budget and noise. For instance, the link budget can correspond to an accounting of signal gains and losses between a base station (for instance, cellular infrastructure equipment 2) and UE (for instance, mobile device 3c) through all units along the communication chain.

An auxiliary signal boosting unit can be implemented in a wide variety of ways, including, but not limited to, using any of the embodiments of signal boosting units depicted in FIGS. 4A-4D.

Although depicted using a primary signal boosting unit 4 in which the base station antenna, the mobile station antenna, and the booster circuitry are integrated in a common housing, other implementations are possible. For example, the primary signal boosting unit 4 can be omitted in favor of using the signal boosting unit 141 of FIG. 3.

In certain implementations, each of the auxiliary signal boosting units includes a directional base station antenna. For example, the base station antenna of the first auxiliary signal boosting unit 340a and the base station antenna of the second auxiliary signal boosting unit 340b can each be implemented with a directionality of at least 17 dBi.

By using directional antennas, the base station antenna of the first auxiliary signal boosting unit 340a can generate a robust communication link with the mobile station antenna of the primary signal boosting unit 4, and the base station antenna of the second auxiliary signal boosting unit 340b can generate a robust communication link with the mobile station antenna 345a of the first auxiliary signal boosting unit 340a.

In a first example, the base station antenna of the first auxiliary signal boosting unit 340a and/or the base station antenna of the second auxiliary signal boosting unit 340b is implemented as a passive MIMO base station antenna array, thereby realizing high antenna gain in a desired direction using an array of antenna elements with spatial diversity.

In a second example, the base station antenna of the first auxiliary signal boosting unit 340a and/or the base station antenna of the second auxiliary signal boosting unit 340b is implemented as an active beamforming base station antenna array.

In such an implementation, the base station antenna of an auxiliary signal boosting unit can adjust or change the angle of beams transmitted or received on the base station antenna to enhance performance. For example, beamforming can be used to compensate for an installation error in pointing the base station antenna of the auxiliary signal boosting unit toward a mobile station antenna of another signal boosting unit.

Moreover, in certain implementations, the auxiliary signal boosting unit can be implemented to regularly realign or calibrate a direction of beamforming, thereby compensating for changes in the relative positions and/or orientations between the auxiliary signal boosting unit and another signal boosting unit over time. For instance, the beamforming calibration can be used to provide adjustment when one or more of the signal boosting units are moved (for instance, accidentally bumped) by people and/or pets in the building 320.

Accordingly, beamforming can be used to align communications between a pair of signal boosting units, thereby enhancing the strength of the wireless communication link therebetween.

In certain implementations, the mobile station antenna of an auxiliary signal boosting unit has a directionality of less than 6 dBi or less, thereby allowing the mobile station antenna to transmit and receive signals over a wide angular range. For example, the mobile station antenna of an auxiliary signal booster can be implemented to radiation pattern substantially covering a hemisphere, for instance, at least 75 percent of the hemisphere. In another embodiment, the mobile station antenna of an auxiliary signal boosting unit is omnidirectional.

Figure 6:
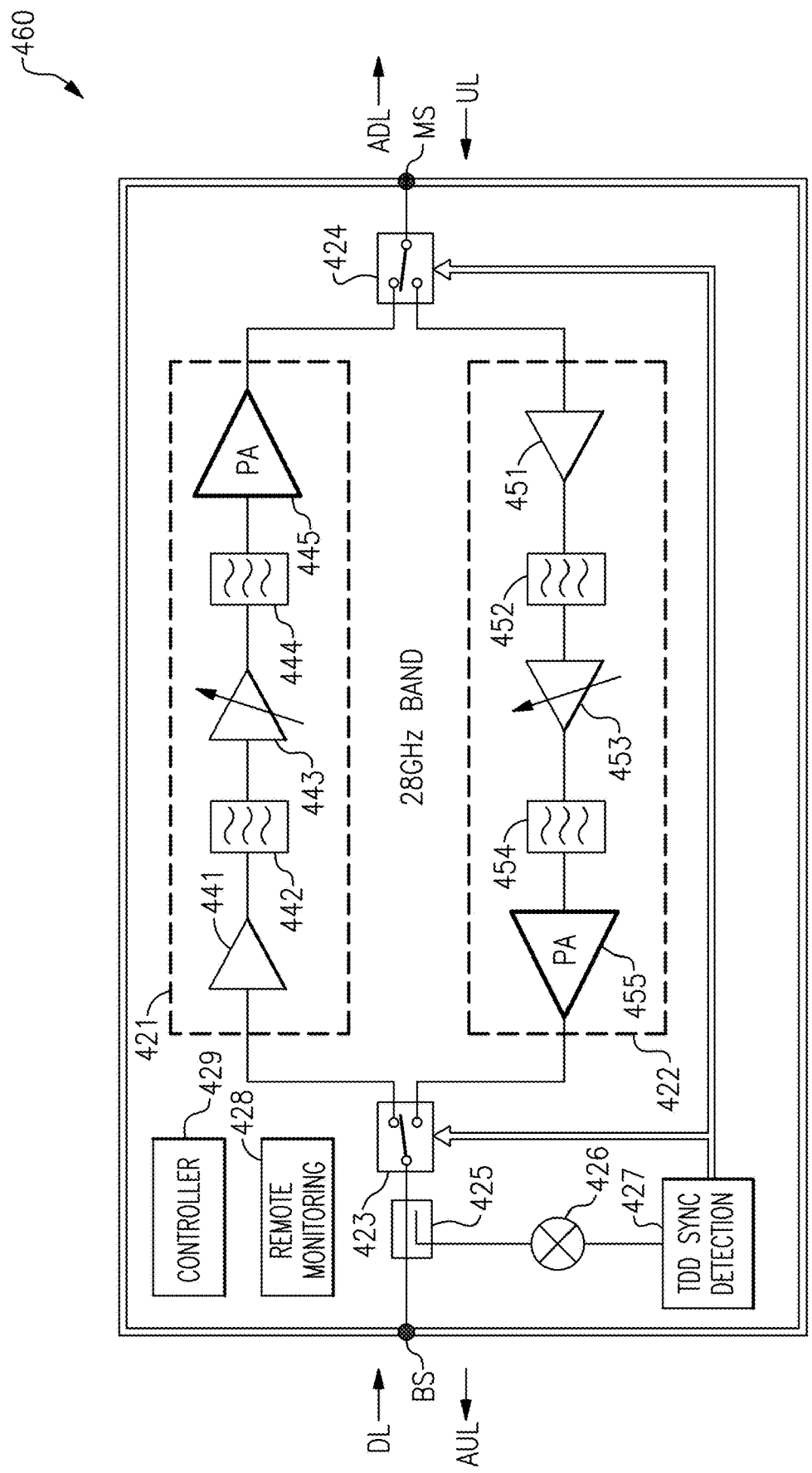
FIG. 6 is a schematic diagram of one embodiment of booster circuitry for a signal boosting unit.

FIG. 6 is a schematic diagram of one embodiment of booster circuitry 460 for a signal boosting unit. The booster circuitry 460 includes a downlink amplification circuit 421, an uplink amplification circuit 422, a first TDD switch 423, a second TDD switch 424, a directional coupler 425, a downconverting mixer 426, a TDD synchronization detection circuit 427, a remote monitoring circuit 428, and a controller 429. The booster circuitry 460 further includes a base station antenna terminal BS for connecting to a base station antenna, and a mobile station antenna terminal MS for connecting to a mobile station antenna.

Although one embodiment of booster circuitry for a primary or auxiliary boosting unit is shown, the teachings herein are applicable to booster circuitry implemented in a wide variety of ways.

As shown in FIG. 6, the first TDD switch 423 selectively connects the base station antenna terminal BS to an input of the downlink amplification circuit 421 or to an output of the uplink amplification circuit 422. Additionally, the second TDD switch 424 selectively connects the mobile station antenna terminal MS to an output of the downlink amplification circuit 421 or to an input of the uplink amplification circuit 422.

Thus, a state of the first TDD switch 423 and the second TDD switch 424 can be controlled to selectively provide amplification to a downlink signal DL received on the base station antenna terminal BS or to an uplink signal UL received on the mobile station antenna terminal MS.

For example, when the first TDD switch 423 and the second TDD switch 424 select the downlink amplification circuit 421, the downlink amplification circuit 421 amplifies the downlink signal DL received on the base station antenna terminal BS to generate an amplified downlink signal ADL on the mobile station antenna terminal MS. Additionally, when the first TDD switch 423 and the second TDD switch 424 select the uplink amplification circuit 422, the uplink amplification circuit 422 amplifies the uplink signal UL received on the mobile station antenna terminal MS to generate an amplified uplink signal AUL on the base station antenna terminal BS.

In the illustrated embodiment, the booster circuitry 460 includes the TDD synchronization detection circuit 427 for controlling the state of the first TDD switch 423 and the second TDD switch 424. As shown in FIG. 6, the TDD synchronization detection circuit 427 is coupled to the base station antenna terminal BS by way of the directional coupler 425 and the downconverting mixer 426. Although one location along the downlink signal path is shown for coupling the TDD synchronization detection circuit 427, other implementations are possible. For example, in another embodiment, TDD synchronization detection is provided after amplifying the downlink signal. For instance, the TDD synchronization detection circuit 427 can be positioned at the output of the downlink amplification circuit 421.

The directional coupler 425 serves to generate a sensed downlink signal based on sensing the downlink signal DL received on the base station antenna terminal BS. Additionally, the downconverting mixer 426 serves to downconvert the sensed downlink signal to generate a downconverted downlink signal for processing by the TDD synchronization detection circuit 427. Although not shown in FIG. 6, the downconverting mixer 426 receives a local oscillator (LO) signal for controlling the frequency used for downconversion. In certain implementations, the frequency of the LO signal can be selected to be about equal to the carrier frequency of the downlink signal DL, for instance, about 28 GHz, in this example. In other implementations, an intermediate frequency (IF) is used for downconversion.

With continuing reference to FIG. 6, the TDD synchronization detection circuit 427 processes the downconverted downlink signal to recover network timing information indicating time slots used for uplink and downlink transmissions. Accordingly, the TDD synchronization detection circuit 427 processes the downconverted downlink signal to determine network timing information, and uses the recovered network timing information to control the state of the first TDD switch 423 and the second TDD switch 424.

Although shown as including a first TDD switch 423 and a second TDD switch 424, other implementations are possible. For example, in another embodiment a circulator is used in place of or combined with a TDD switch to allow handling of higher signal power.

In the illustrated embodiment, the booster circuitry 460 includes the TDD synchronization detection circuit 427. The TDD synchronization detection circuit 427 processes the downconverted downlink signal to recover network timing information, the TDD synchronization detection circuit 427 need not fully recover data carried by the downlink signal DL.

By including the TDD synchronization detection circuit 427, the downlink amplification circuit 421 is activated during time slots used for transmitting the downlink signal DL, and the uplink amplification circuit 422 is activated during time slots used for transmitting the uplink signal UL.

In the illustrated embodiment, the downlink amplification circuit 421 includes a low noise amplifier (LNA) 441, a first bandpass filter 442, a controllable gain amplifier 443, a second bandpass filter 444, and a power amplifier (PA) 445. Additionally, the uplink amplification circuit 422 includes an LNA 451, a first bandpass filter 452, a controllable gain amplifier 453, a second bandpass filter 454, and a PA 455. In this example, the downlink amplification circuit 421 and the uplink amplification circuit 422 are implemented for providing boosting of uplink and downlink signals, respectively, in the 28 GHz band. However, the teachings herein are applicable to other frequency ranges and bands.

Although one embodiment of downlink and uplink amplification circuits is shown, the teachings herein are applicable to downlink and uplink amplification circuits implemented in a wide variety of ways.

As shown in FIG. 6, neither the downlink amplification circuit 421 nor the uplink amplification circuit 422 include any mixers for shifting the frequency of the signals. In certain implementations herein, a signal booster unit operates with wideband operation amplifying multiple channels of (for instance, a full bandwidth of) a 5G NR band (such as n261, n257, n258, or n260) and/or amplifies FR2/millimeter wave signals without any frequency upconversion or frequency downconversion.

The controller 429 provides a number of control functionalities associated with the booster circuitry 460. The controller 429 can be implemented in a wide variety of ways, for instance, as a microprocessor, microcontroller, computer processing unit (CPU), and/or other suitable control circuitry. Example functions of the controller 429 are power control (for instance, automatic gain control), oscillation detection, and/or shutdown.

In the illustrated embodiment, the controller 429 provides control over gain of the controllable gain amplifier 443 of the downlink amplification circuit 421 and the controllable gain amplifier 453 of the uplink amplification circuit 422. However, other implementation of gain control are possible. For example, the control circuitry can control the attenuation provided by controllable attenuation components (for instance, digital step attenuators and/or voltage variable attenuators) and/or the gain provided by controllable gain amplifiers (for instance, variable gain amplifiers and/or programmable gain amplifiers).

Although not depicted in FIG. 6, the downlink amplification circuit 421 and/or the uplink amplification circuit 422 can include one or more power detectors for generating power detection signals for the controller 429. Additionally or alternatively, other detectors or sensors, such as a temperature detector, can aid the controller 429 in providing information used for control functionality.

Although depicted as including one uplink amplification circuit and one downlink amplification circuit, multiple uplink amplification circuits and downlink amplification circuits can be included, for instance, for each frequency band for which the booster circuitry provides signal boosting.

In certain implementations, the controller 429 is shared by multiple uplink amplification circuits and/or downlink amplification circuits. For example, the controller 429 can correspond to a processing chip (for instance, a microprocessor chip, microcontroller chip, or CPU chip) that provides centralized control of a signal boosting unit.

In the illustrated embodiment, the booster circuitry 460 further includes the remote monitoring circuit 428, which provides remote monitoring. In certain implementations, the remote monitoring circuit 428 includes a transceiver for communicating information pertaining to operation of a signal boosting unit with another device, such as a computer (for instance, a desktop or laptop), a tablet, or a mobile phone. Thus, remote access and control to a signal booster system can be provided. Remote monitoring and control is wireless in certain implementations, for instance, by using a wireless interface controlled by a cellular modem and/or Internet of Things (IoT) modem.

Examples of such information includes, but is not limited to, whether the signal boosting unit is powered, whether boosting is active for one or more bands, antenna status, a temperature condition, and/or whether oscillation/pre-oscillation has occurred. In certain implementations, the remote monitor 428 can be used to receive instructions for remote shut-down or power control, remote control of gain and/or attenuation (including, for example, band specific control), and/or remote control of antenna selection (for instance, in multi-antenna configurations). In yet another example, the remote monitor 428 receives settings for beamforming (see, for example, the embodiment of FIG. 10).

In the illustrated embodiment, the booster circuitry 460 operates without frequency upconversion and without frequency downconversion. Thus, the frequency of an amplified uplink signal outputted by the booster circuitry 460 is equal to the frequency of the received uplink signal, and the frequency of the amplified downlink signal outputted by the booster circuitry 460 is equal to the frequency of the received downlink signal.

By operating without frequency upconversion/downconversion, lower latency group delay is provided. This in turns facilitates enhanced layer performance and/or increased tolerance to multipath signals.

Figure 7:
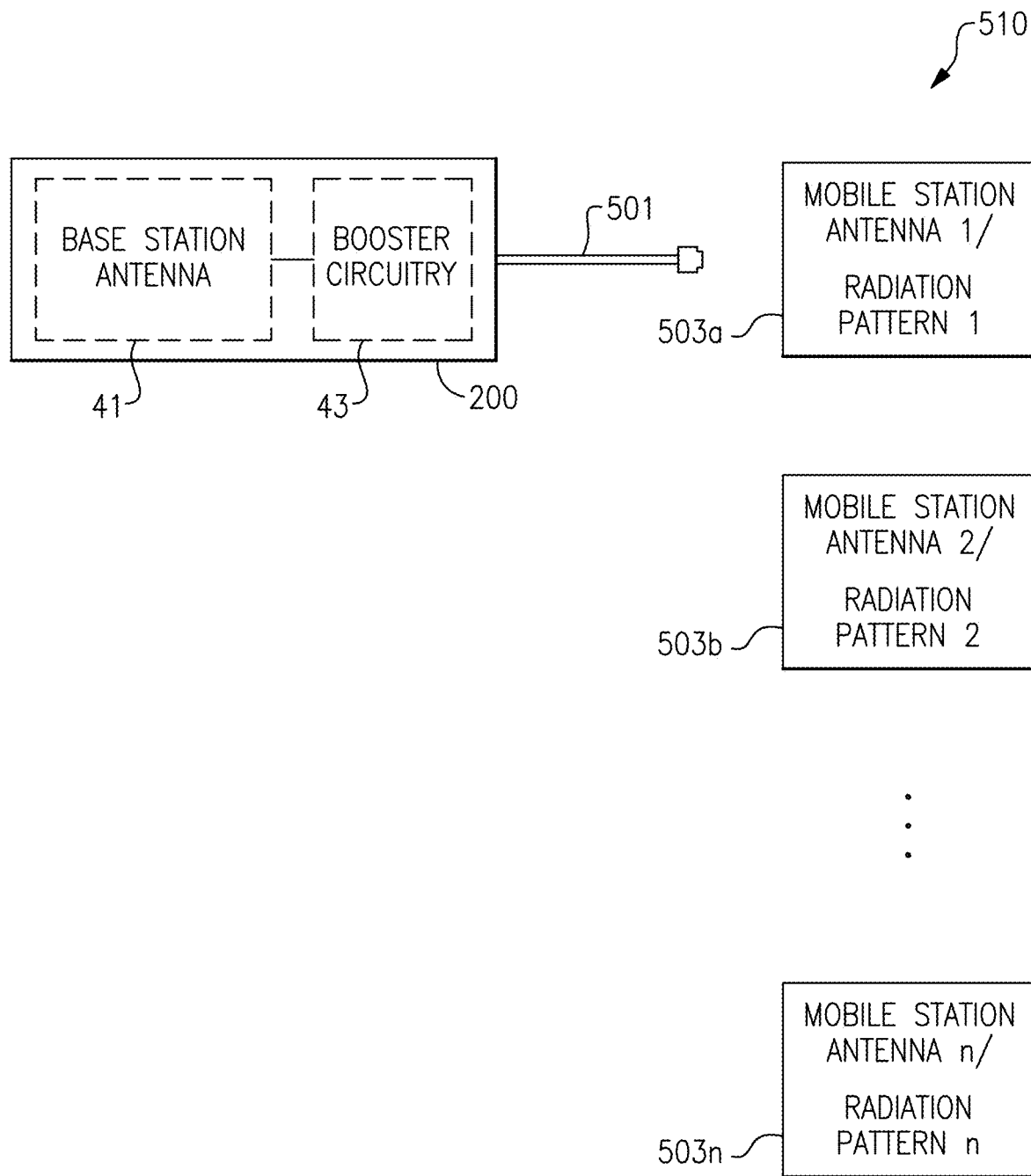
FIG. 7 is a schematic diagram of one embodiment of a signal boosting unit with selectable mobile station antennas for configurable radiation pattern.

FIG. 7 is a schematic diagram of one embodiment of a signal boosting unit 510 with selectable mobile station antennas for configurable radiation pattern. The signal boosting unit 510 includes a housing 200 having a base station antenna 41 and booster circuitry 43 integrated therewith. The signal boosting unit 510 further includes a pluggable cable 501 and different mobile station antennas 503a, 503b, . . . 503n with different radiation patterns.

The signal boosting unit 510 is implemented to operate with a selected mobile station antenna chosen from multiple mobile station antennas having different radiation patterns suitable for different rooms of a building. For example, the pluggable cable 501 can be plugged into the mobile station antenna 503a, the mobile station antenna 503b, or the mobile station antenna 503n, each of which have a different radiation pattern, for instance, different amounts of directionality. Although an example with three mobile station antennas 503a, 503b, . . . 503n is shown, more or fewer mobile station antennas can be available for connection as indicated by the ellipses.

In certain implementations, the pluggable cable 501 is less than 5 feet. Although shown as being pluggable on one end, the pluggable cable 501 can be pluggable on either or both ends.

In certain implementations, the housing 200, the pluggable cable 501, and the mobile station antennas 503a, 503b, . . . 503n are included in a kit. Additionally, the user selects one of the mobile station antennas 503a, 503b, . . . 503n from the kit having a radiation pattern suitable for a desired deployment of the signal boosting unit 510. For instance, a mobile station antenna having a radiation pattern suitable for a particular shaped room can be selected. In other implementations, one or more of the mobile station antennas 503a, 503b, . . . 503n are sold separately (for instance, individually), and a user purchases or otherwise acquires one or more of the mobile station antennas.

Figure 8A:
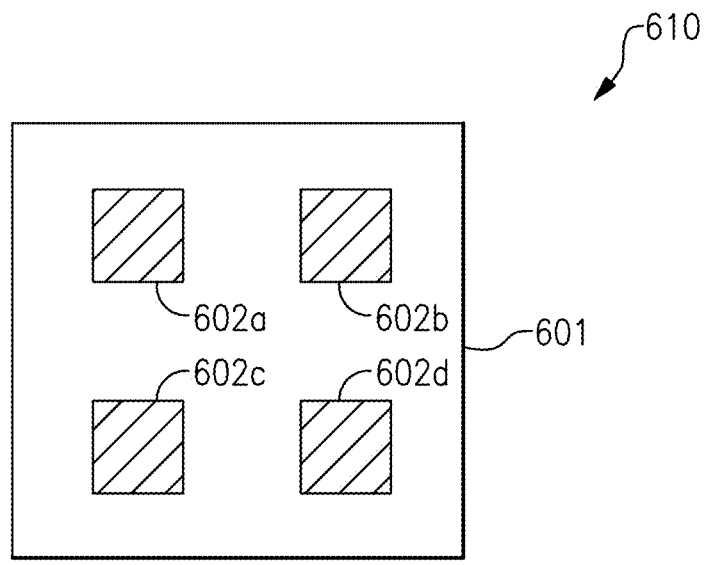
FIG. 8A is a diagram of an overhead or frontal view of one embodiment of a passive multiple-input multiple-output (MIMO) antenna array.
Figure 8B:
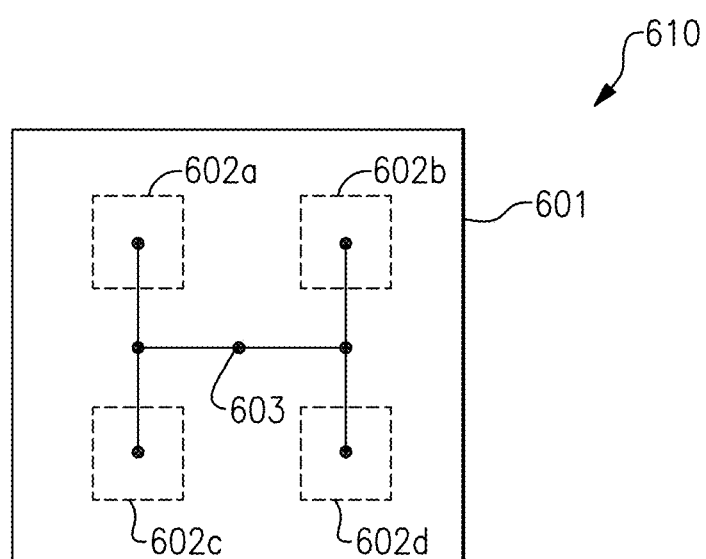
FIG. 8B is a diagram of a backside view of the passive MIMO antenna array of FIG. 8A.

FIG. 8A is a diagram of an overhead view of one embodiment of a passive MIMO antenna array 610. FIG. 8B is a diagram of a backside view of the passive MIMO antenna array 610 of FIG. 8A. The passive MIMO antenna array 610 includes a first patch antenna element 602a, a second patch antenna element 602b, a third patch antenna element 603c, and a fourth patch antenna element 602d formed on a first or front surface of an antenna substrate 601, such as a printed circuit board (PCB).

The passive MIMO antenna array 610 illustrates one embodiment of a passive MIMO antenna array for serving as a base station antenna. However, the teachings herein are applicable to base station antennas implemented in a wide variety of ways, including, but not limited to, using other configurations of passive MIMO antenna arrays or other directional antennas.

The antenna elements 602a-602d are positioned in different physical locations to provide spatial diversity. As shown in FIG. 6B, the antenna elements 602a-602d are controlled using a common signal feed 603. Thus, when the passive MIMO antenna array 610 is receiving, the signals are combined to form an aggregate or combined receive signal. Additionally, when the passive MIMO antenna array 610 is transmitting, a transmit signal received at the common signal feed 603 is split such that the transmit signal is radiated using each of the antenna elements 602a-602d.

Although shown with four antenna element in a 2×2 array, other numbers of antenna elements (for instance, larger arrays) and/or other arrangements of antenna elements are possible.

Figure 9:
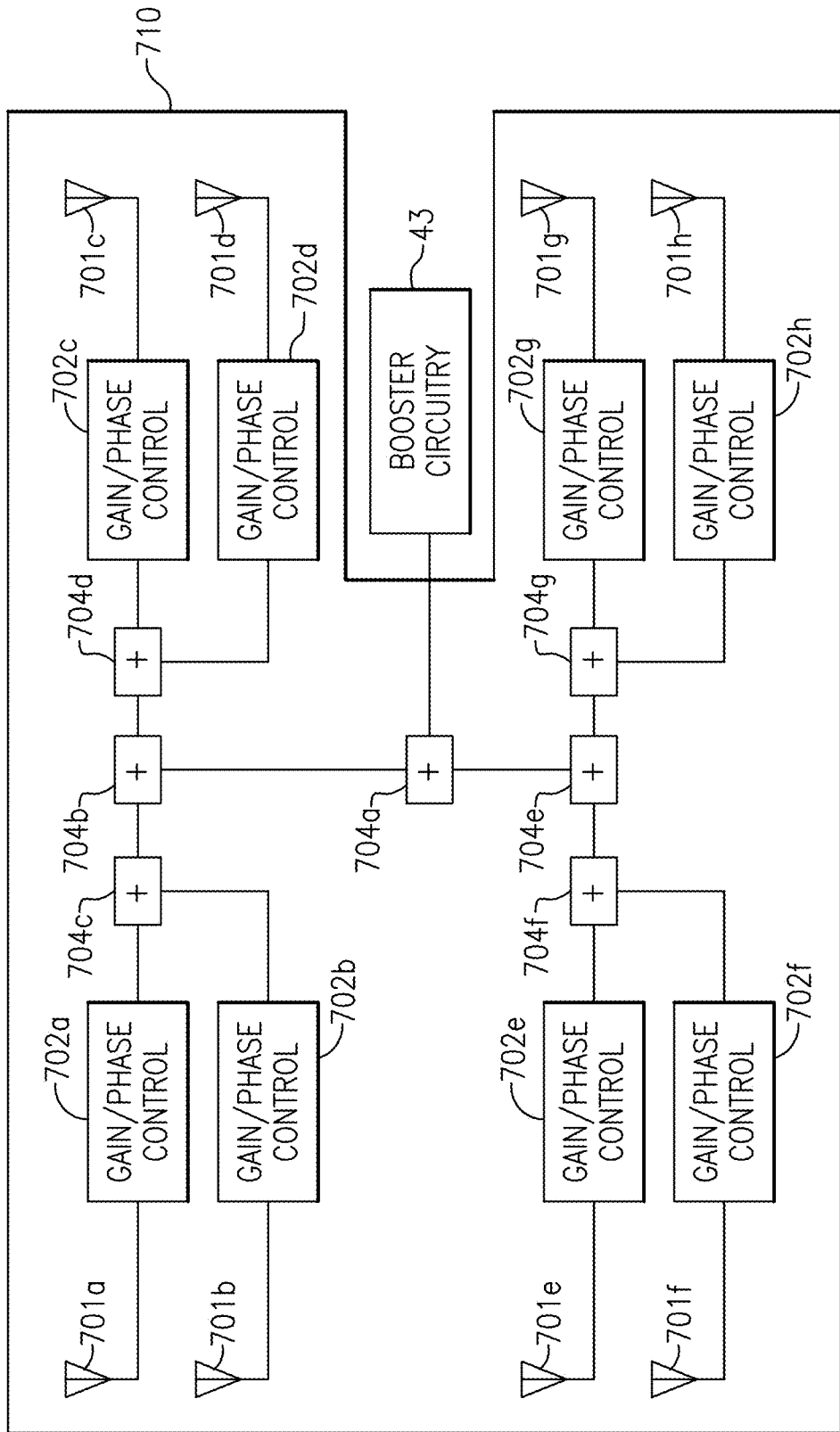
FIG. 9 is a schematic diagram of one embodiment of an active beamforming antenna array coupled to booster circuitry.

FIG. 9 is a schematic diagram of one embodiment of an active beamforming antenna array 710 coupled to booster circuitry 43.

In the illustrated embodiment, the active beamforming antenna array 710 includes first to eighth antenna elements 701a-701h, respectively, first to eighth gain/phase control circuits 702a-702h, respectively, and first to seventh combiners/splitters 704a-704g, respectively.

The active beamforming antenna array 710 illustrates one embodiment of an active beamforming antenna array for serving as a base station antenna. However, the teachings herein are applicable to base station antennas implemented in a wide variety of ways, including, but not limited to, using other configurations of active beamforming antenna arrays or other directional antennas.

Although shown as including an array of eight antenna elements, more or fewer antenna elements and corresponding signal processing circuitry can be included.

With reference to FIG. 9, beamforming of a transmit beam is accomplished by separately controlling the phase and magnitude of an RF transmit signal (for instance, an uplink signal for transmission) from the booster circuitry 43 using the gain/phase control circuits 702a-702h, thereby focusing RF energy in a particular direction. When beamforming a receive beam, the gain and phase of RF signals received by the antenna elements 702a-702h are controlled such that the aggregate receive signal (for instance, a downlink signal) provided to the booster circuitry 43 indicates electromagnetic energy received by the antenna array from a particular direction.

Accordingly, beamforming is applicable to both transmit and receive directions. Additionally, the combiners/splitters 704a-704g provide signal splitting when the antenna array is transmitting, and provide signal combining when the antenna array is receiving.

In certain implementations, the gain/phase control circuits 702a-702h are formed on a semiconductor die that includes a serial interface, such as an I²C bus, that receives data for selecting a particular beam pattern (for instance, a transmit or receive beam of a particular angle and strength) for beamforming.

Such settings for beamforming can be controlled in a wide variety of ways. In certain implementations, a controller of the booster circuitry 43 (for instance, the controller 429 of FIG. 6) provides data for controlling beamforming. For instance, the controller can be formed on a first semiconductor die that is coupled to a second semiconductor die including the gain/phase control circuitry, and the controller can provide data for controlling beamforming over a serial interface connecting the dies. In certain implementations, software of the controller (for instance, software stored in a memory circuit of the controller 429 of FIG. 6) can control or determine settings for beamforming.

Accordingly, the controller of the booster circuitry 43 is used to manage beamforming in certain implementations.

In certain implementations, beamforming is used to angularly align beams transmitted and received from a base station antenna of a signal boosting unit with respect to the mobile station antenna of cellular infrastructure equipment or of another signal boosting unit. For example, beamforming can be used to correct for an installation error in pointing an active beamforming antenna array at another antenna.

Additionally or alternatively, beamforming can be used to regularly realign or calibrate a direction of beamforming to compensate for changes in the relative position and/or orientation between the active beamforming antenna array and another antenna. For instance, signal boosting units can be bumped or moved, which can lead to a change in antenna position and/or orientation over time.

Thus, beamforming can be used to align communications between a base station antenna of a signal boosting unit and a mobile station antenna of cellular infrastructure equipment or of another signal boosting unit, thereby enhancing the strength of the wireless communication link therebetween.

Such beamforming in the signal boosting unit can be separate or independent of any beamforming in the cellular protocol, such as beamforming information incorporated or built into 5G communications. For example, the signal boosting unit can be stationary absent occasional changes to antenna orientation and/or position, and thus need not track objects in real time. Accordingly, beamforming for a signal boosting unit need not decode the baseband signals to manage beamforming, but rather can provide beamforming that is additional to or supplements any underlying beamforming in the communication protocol. In another embodiment, a signal is processed in a 5G NR beamforming protocol layer to do active beamforming. Accordingly, the teachings herein area also application to signal boosters that manipulate the lower layer protocol in an uplink direction and/or a downlink direction.

One example algorithm for beamforming in a signal boosting unit will now be provided. Such an algorithm can be performed by a controller of the signal boosting unit, such as by using a processor and memory of the controller 429 of FIG. 6, in combination with an active beamforming antenna array, such as the active beamforming antenna array 710 of FIG. 9.

In a first step of the example beamforming algorithm, the direction control for beamforming is set in a neutral setting (for instance, non-directional), and the received signal strength is characterized using one or more power detectors, which can be included in the active beamforming antenna array and/or in booster circuitry. For instance, a high speed power detector can be used to measure signal strength each time a time interval completes (for instance, every 10 microseconds over several seconds). For TDD communications, such measurements can occur during receive slots, with a flat portion of the measured data used to identify a pattern of signal levels.

In a second step of the example beamforming algorithm, the phase and gain associated with each antenna element is controlled to focus the beam to point in a particular direction within the angular range of the antenna array, and step one is performed to measure signal strength for this beam direction. The second step is repeated for multiple beam directions, thereby collecting signal strength data for multiple beam directions, such as beam directions spanning the full angular range of the antenna array.

In one example, the second step is performed by measuring signal strength when pointing the beam in an upper left portion of directional control allowed, and thereafter incrementally moving the beam direction right and measuring signal strength until the angular range of the antenna array can no longer be moved right and a horizontal slice of the angular range has been covered. A horizontal sweep can be repeated for each desired vertical beam setting, thus sweeping a desired portion of the area covered by the antenna array.

In a third step of the example beamforming algorithm, the beamforming setting with about the highest receive signal strength can be used. Such setting can be fixed or static until the next beam direction calibration is performed (if any).

In certain implementations, a coarse search is first performed by measuring signal strength for each of multiple coarse beam directions in the angular range of the antenna array. After the direction with about the highest signal strength is identified, a fine sweep can be performed for beam directions adjacent to or nearby the beam direction identified by the coarse sweep. Additionally, the direction with about the highest signal strength from the fine sweep can be used to as the selected beamforming setting.

Figure 10:
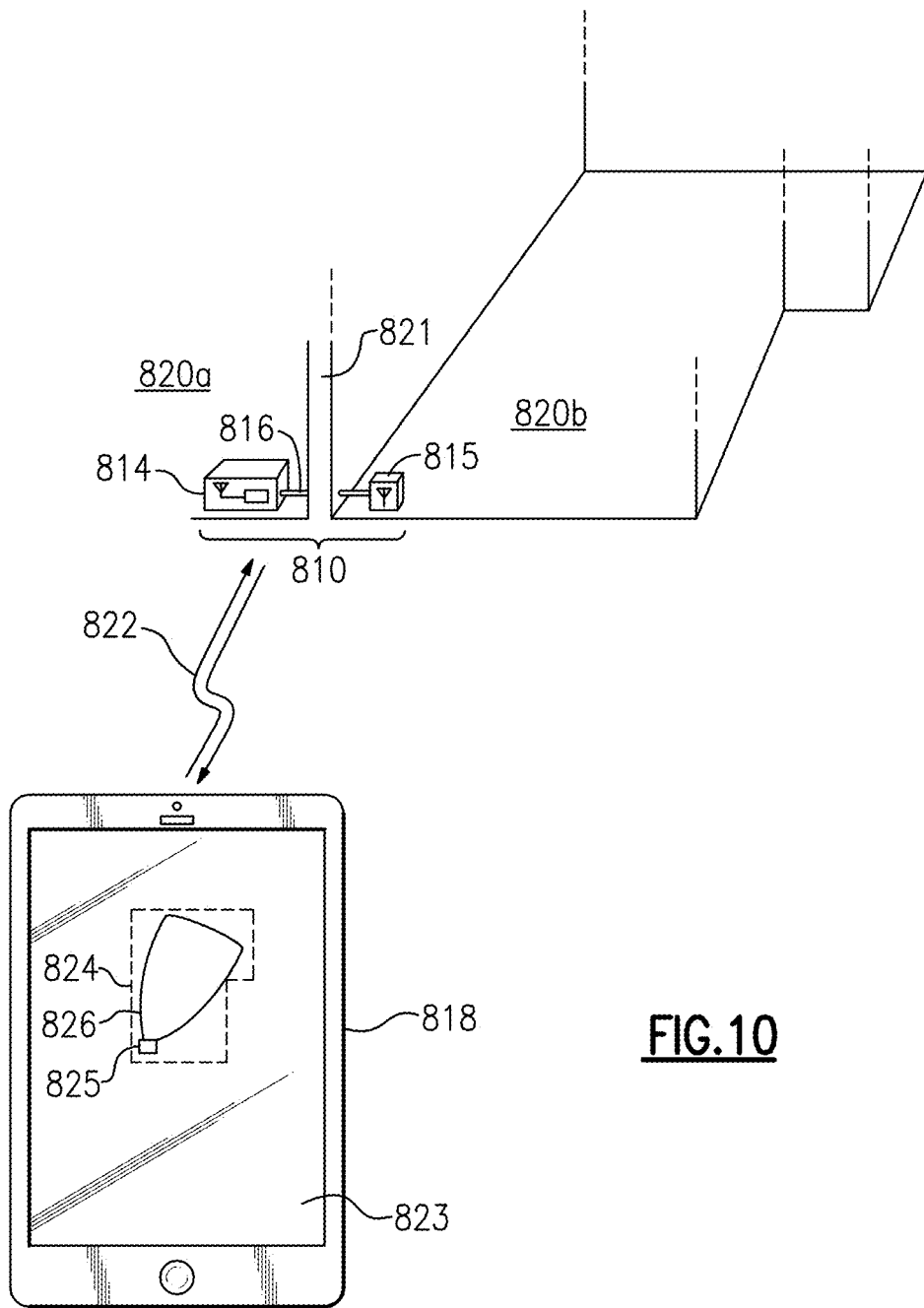
FIG. 10 is a schematic diagram of a signal boosting unit in communication with a control device according to one embodiment.

FIG. 10 is a schematic diagram of a signal boosting unit 810 in communication with a control device 818 (corresponding to a mobile phone or tablet, in this example) according to one embodiment. The signal boosting unit 810 corresponds to one embodiment of an auxiliary signal boosting unit. Although depicted in the context of an auxiliary signal boosting unit, a primary signal boosting unit can also be controlled with a control device in a similar manner.

In the illustrated embodiment, the signal boosting unit 810 includes a housing 814 in which a base station antenna and booster circuitry have been integrated therewith. The signal boosting unit 810 further includes a mobile station antenna 815 connected to the housing 814 using a cable 816.

As shown in FIG. 10, the housing 814 is positioned in a first room 820a of a building, while the mobile station antenna 815 is positioned in a second room 820b of the building. Additionally, the cable 816 is provided through an interior wall 821 of the building separating the first room 820a and the second room 820b.

The booster circuitry of the housing 814 is in communication with the control device 818 over a communication link 822, which can be wired or wireless. In certain implementations, the booster circuitry includes a controller (for instance, the controller 429 of FIG. 6) and/or a remote monitoring circuit (for instance, the remote monitoring circuit 428 of FIG. 6) that includes a transceiver for communicating with the control device 818.

The control device 818 includes a processor and memory for executing a software program or application associated with the signal boosting unit 810. As shown in FIG. 10, the control device 818 includes a display 823 that is rendering information outputted from the software application. The information includes a graphical rendering 824 of the room 820b, a graphical rendering 825 of the location of the mobile station antenna 815 within the room 820b, and a graphical rendering 826 of a radiation pattern of the mobile station antenna 815 within the room 820b.

With reference to FIGS. 7 and 10, in certain implementations, the cable 816 of the signal boosting unit 810 is pluggable to allow selection of different mobile station antennas with different radiation profiles. Additionally, the control device 818 graphically depicts radiation patterns corresponding to a particular mobile station antenna, thereby aiding the user in selecting a mobile station antenna suitable for deployment in the room 820b.

In another embodiment, the mobile station antenna 815 is configurable, for instance, implemented as an active beamforming antenna array in which characteristics of the beam (such as direction and/or strength) can be controlled by choosing gain and phase settings of gain/phase control circuits associated with antenna elements of the array. In such an embodiment, the mobile device 818 can be used to control characteristics of the beam to aid in providing a beam direction suitable for the room 820b. For instance, the user can use the software application to select a beamforming setting, with the graphical rendering 826 on the display 823 corresponding to the radiation pattern associated with the beamforming setting.

Example of Loss and Isolation Calculations

This section provides one example of loss and isolation calculations pertaining to high frequency cellular networks and signal boosters.

Table 1 below provides calculations pertaining to isolation for a horizontal arrangement of a base station antenna and a mobile station antenna. The calculations are generated based on an isolation formula $Lh=22+20*lg(d/\lambda)-(Gt+Gr)+(Dt+Dr)$.

TABLE 1

| Frequency(MHz) | 28000 | 2100 | 700 |
|---|---|---|---|
| Wavelength(m) | 0.011 | 0.143 | 0.429 |
| Gain1(dB) | 10 | 7 | 4 |
| Front-to-rear ratio; 1(dB) | 17 | 12 | 6 |
| Gain2(dB) | 10 | 7 | 4 |
| Front-to-rear ratio; 2(dB) | 17 | 12 | 6 |
| Distance1Feet | 64.94 | 38.44 | 22.90 |
| Distance2Feet | 70.96 | 44.46 | 28.92 |
| Distance3Feet | 74.49 | 47.99 | 32.44 |
| Distance2M | 81.42 | 54.92 | 39.38 |

Table 2 below provides calculations pertaining to isolation for a vertical arrangement of a base station antenna and a mobile station antenna. The calculations are generated based on an isolation formula $Lv=28+40*lg(d/\lambda)-(Gt+Gr)+(Dt+Dr)$.

TABLE 2

| Frequency(MHz) | 28000 | 2100 | 700 |
|---|---|---|---|
| Wavelength(m) | 0.011 | 0.143 | 0.429 |
| Gain1(dB) | 10 | 7 | 4 |
| Front-to-rear ratio; 1(dB) | 17 | 12 | 6 |
| Gain2(dB) | 10 | 7 | 4 |
| Front-to-rear ratio; 2(dB) | 17 | 12 | 6 |
| Distance1Feet | 85.89 | 40.89 | 21.80 |
| Distance2Feet | 97.93 | 52.93 | 33.85 |
| Distance3Feet | 104.97 | 59.97 | 40.89 |
| Distance2M | 118.84 | 73.85 | 54.76 |

Table 3 below provides calculations pertaining to isolation at 45 degrees in which horizontal and vertical displacements of a base station antenna and a mobile station antenna are equal. The calculations are generated based on an isolation formula $Ls=(Lv-Lh)(\alpha/90)+Lh$.

TABLE 3

| Frequency(MHz) | 28000 | 2100 | 700 |
|---|---|---|---|
| Distance1Feet | 75.415 | 39.667 | 22.353 |
| Distance2Feet | 84.446 | 48.697 | 31.384 |
| Distance3Feet | 89.728 | 53.980 | 36.667 |
| Distance2M | 100.132 | 64.384 | 47.070 |

Table 4 below provides calculations pertaining to free space propagation path loss. The calculations are generated based on a path loss model 20 Lgf+20 LgD−27.55 dB.

TABLE 4

| Frequency(MHz) | D(m) | Constant(dB) | Path Loss(dB) |
|---|---|---|---|
| 28000 | 100 | 27.56 | 101.4 |
| 2100 | 100 | 27.56 | 78.9 |
| 700 | 100 | 27.56 | 69.3 |

Table 5 below provides FCC test report reference values of antenna gain and EIRP for different entities.

TABLE 5

| Entity | Antenna Gain(dBi) | Single Antenna EIRP (dBm) |
|---|---|---|
| Samsung | 25 | 48 |
| Ericsson | 24 | 46 |
| Nokia | 29 | 57 |
| Samsung CPE | 19 | 35~39 |

Table 6 below provides calculations pertaining to a Hata model Lb=69.55+26.16 lgf−13.821 ghb−α(hm)+(44.9−6.55 lgh)lgd. For example, Lb corresponds to median smooth terrain radio wave propagation loss in urban areas, measured in decibels (dB). Additionally, hb corresponds to base station antenna effective height (measured in meters), while hm corresponds to mobile station effective antenna height (measured in meters). Furthermore, d corresponds to the distance between mobile station and base station (measured in kilometers), and α(hm) to mobile station antenna height factor. At frequencies less than or equal to 300 MHz, α(hm)=8.29 [lg(1.54 hm)]2−1.1 dB, while at frequencies greater than 300 MHz, α(hm)=3.2[lg(11.75 hm)]2−4.97 dB. With respect to a big city operating environment, hm=1.5 m, α(hm)=0, while for medium and small cities hm=(1.56 lgf−0.8) and α(hm)=(1.1 lgf−0.7). Furthermore, for suburbs Lbs=Lb (Urban area)−2[lg(f/28)]2−5.4.

TABLE 6

| f (MHz) | hb (m) | hm (m) | d (km) | α (hm) big city | α (hm) med/small city | Lb big city | Lb med/small city | suburbs |
|---|---|---|---|---|---|---|---|---|
| 28000 | 20.00 | 1.50 | 0.10 | 0.00 | 0.15 | 131.53 | 131.38 | 108.13 |
| 28000 | 20.00 | 1.50 | 0.05 | 0.00 | 0.15 | 120.58 | 120.43 | 97.18 |
| 28000 | 20.00 | 1.50 | 0.025 | 0.00 | 0.15 | 109.63 | 109.48 | 86.23 |
| 700 | 20.00 | 1.50 | 0.10 | 0.00 | 0.01 | 89.62 | 89.61 | 80.31 |

Table 7 below provides calculations pertaining to big city results for a Hata model Lb=69.55+26.16 lgf−13.821 ghb−α(hm)+(44.9−6.55 lghb)lgd.

TABLE 7

| f (GHz) | BS EIRP (dBm) | d (m) BS to booster | receive signal strength | donor ANT gain (dBi) | booster gain (dB) | output power (dBm) | retransmit ANT gain (dBi) | EIRP (dBm) |
|---|---|---|---|---|---|---|---|---|
| 28(E1) | 48.00 | 50.00 | −72.58 | 10.00 | 100.00 | 37.42 | 10.00 | 47.42 |
| 28(E2) | 48.00 | 100.00 | −83.53 | 10.00 | 110.00 | 36.47 | 10.00 | 46.47 |
| 28(E3) | 48.00 | 25.00 | −61.63 | 10.00 | 90.00 | 38.37 | 10.00 | 48.37 |

Table 8 below provides calculations relating to a number of small base stations deployed. The calculations are based on data from the preceding tables.

TABLE 8

| long (m) | width (m) | coverage area (square km) | # of small base stations | # of small base stations per square km |
|---|---|---|---|---|
| 500 | 500 | 0.25 | 100 | 400 |
| 500 | 500 | 0.25 | 25 | 100 |
| 500 | 500 | 0.25 | 400 | 1600 |
| 500 | 500 | 0.25 | 100 | 400 |

Although one example of loss and isolation calculations have been provided in this section, calculation results can vary based on a wide variety of factors, such as models and/or parameters. Accordingly, other results are possible.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not only the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A signal booster system for a high frequency cellular network, the signal booster system comprising:
    a signal boosting unit comprising:
        a base station antenna configured to receive a downlink signal of a frequency band and to transmit an amplified uplink signal of the frequency band, wherein the base station antenna is directional;
        booster circuitry configured to amplify an uplink signal of the frequency band to generate the amplified uplink signal, and to amplify the downlink signal to generate an amplified downlink signal of the frequency band, wherein the frequency band is a 5G frequency band;
        a housing in which the base station antenna and the booster circuitry are integrated; and
        a mobile station antenna configured to receive the uplink signal and to transmit the amplified downlink signal, wherein the mobile station antenna is configured to connect to the housing by a cable,
    wherein the booster circuitry includes a downlink amplification circuit configured to amplify the downlink signal, an uplink amplification circuit configured to amplify the uplink signal, a first time division duplexing (TDD) switch configured to selectively connect the base station antenna to an input of the downlink amplification circuit or to an output of the uplink amplification circuit, and a second TDD switch configured to selectively connect the mobile station antenna to an output of the downlink amplification circuit or to an input of the uplink amplification circuit.

2. The signal booster system of claim 1, further comprising the cable.

3. The signal booster system of claim 2, wherein the cable has a length of 5 feet or less.

4. The signal booster system of claim 2, wherein the cable is pluggable.

5. The signal booster system of claim 4, further comprising a plurality of mobile station antennas each having a different radiation pattern, the mobile station antenna selected from the plurality of mobile station antennas.

6. The signal booster system of claim 1, wherein the base station antenna comprises a parabolic antenna.

7. The signal booster system of claim 1, wherein the mobile station antenna comprises a sector antenna.

8. The signal booster system of claim 1, wherein the booster circuitry amplifies a full bandwidth of the 5G frequency band using a single uplink amplification path and a single downlink amplification path.

9. The signal booster system of claim 1, wherein the mobile station antenna has a controllable radiation pattern.

10. The signal booster system of claim 1, further comprising a plurality of mobile station antennas each having a different radiation pattern, the mobile station antenna selected from the plurality of mobile station antennas.

11. The signal booster system of claim 1, wherein the base station antenna has a greater amount of directionality than the mobile station antenna.

12. The signal booster system of claim 1, wherein neither the uplink amplification circuit nor the downlink amplification circuit operates with any frequency conversion.

13. The signal booster system of claim 1, further comprising a primary signal boosting unit configured to wirelessly receive the amplified uplink signal from the base station antenna, and to wirelessly transmit the downlink signal to the base station antenna.

14. The signal booster system of claim 13, wherein the primary signal boosting unit is fully integrated in a single housing.

15. The signal booster system of claim 13, installed in a building, wherein the primary signal boosting unit wirelessly communicates with cellular infrastructure through a window of a first room of the building.

16. The signal booster system of claim 15, wherein the housing of the signal boosting unit is in the first room of the building, and the mobile station antenna of the signal boosting unit is in a second room of the building.

17. The signal booster system of claim 16, wherein the cable of the signal boosting unit passes under a door between the first room and the second room.

18. The signal booster system of claim 16, wherein the cable of the signal boosting unit passes through a wall separating the first room and the second room.

19. The signal booster system of claim 1, wherein the signal boosting unit operates in a daisy chain with at least one other signal boosting unit.

20. The signal booster system of claim 1, wherein the downlink amplification circuit comprises a low noise amplifier, a first bandpass filter, a controllable gain amplifier, a second bandpass filter, and a power amplifier.

* * * * *